US012791907B2

(12) United States Patent
Yoshino

(10) Patent No.: US 12,791,907 B2
(45) Date of Patent: Nov. 10, 2026

(54) WAVELENGTH ADAPTER AND WAVELENGTH MODIFICATION METHOD

(71) Applicant: NTT, Inc., Tokyo (JP)

(72) Inventor: Manabu Yoshino, Musashino (JP)

(73) Assignee: NTT, Inc., Tokyo (JP)

( * ) Notice: Subject to any disclaimer, the term of this patent is extended or adjusted under 35 U.S.C. 154(b) by 343 days.

(21) Appl. No.: 18/291,733

(22) PCT Filed: Jul. 26, 2021

(86) PCT No.: PCT/JP2021/027531
§ 371 (c)(1),
(2) Date: Jan. 24, 2024

(87) PCT Pub. No.: WO2023/007547
PCT Pub. Date: Feb. 2, 2023

(65) Prior Publication Data
US 2024/0369904 A1 Nov. 7, 2024

(51) Int. Cl.
*G02F 1/35* (2006.01)
*H04J 14/02* (2006.01)

(52) U.S. Cl.
CPC .......... *G02F 1/3507* (2021.01); *G02F 1/3503* (2021.01); *G02F 1/3536* (2013.01); *H04J 14/0305* (2023.08)

(58) Field of Classification Search
CPC ..... G02F 1/3507; G02F 1/3536; G02F 1/3538
See application file for complete search history.

(56) References Cited

U.S. PATENT DOCUMENTS 7,034,990 B2 * 4/2006 Kamijoh ............... G02F 1/3536 359/326
10,634,974 B2 * 4/2020 Shukunami ......... H01S 3/06712
2001/0007509 A1 * 7/2001 Aso ...................... H04B 10/299 385/24

(Continued)

FOREIGN PATENT DOCUMENTS

JP 2006-177987 A 7/2006

OTHER PUBLICATIONS

Tomoaki Yoshida, "Photonic Gateway and Related Optical Access Technologies to Achieve the All-Photonics Network", NTT Technical Review, Feb. 2021, pp. 36-41.

*Primary Examiner* — Rhonda S Peace
(74) *Attorney, Agent, or Firm* — Harness, Dickey & Pierce, P.L.C.

(57) ABSTRACT

The wavelength adapter includes a first conversion unit, a first filter, a second conversion unit, and a second filter. The first conversion unit converts, by a first pump light, a first signal light into a second signal light having a wavelength not included in a target wavelength band while maintaining a phase relationship of the first signal light. The first filter blocks the first signal light and the first pump light, and allows for transmission of the second signal light. The second conversion unit converts, by a second pump light, the second signal light after transmission through the first filter into a third signal light having a wavelength in the target wavelength band while maintaining a phase relationship of the second signal light. The second filter blocks the second signal light and the second pump light, and allows for transmission of the third signal light.

15 Claims, 27 Drawing Sheets

(56) References Cited

U.S. PATENT DOCUMENTS

| | | | | |
|---|---|---|---|---|
| 2004/0184807 | A1* | 9/2004 | Aso | H04B 10/299 |
| | | | | 398/85 |
| 2005/0105163 | A1* | 5/2005 | Kamijoh | G02F 1/3536 |
| | | | | 359/326 |
| 2005/0111499 | A1* | 5/2005 | Tanaka | G02F 1/3536 |
| | | | | 359/326 |
| 2010/0021105 | A1* | 1/2010 | Watanabe | H04B 10/299 |
| | | | | 359/328 |
| 2019/0109666 | A1* | 4/2019 | Kato | H04J 14/0256 |
| 2019/0353980 | A1* | 11/2019 | Shukunami | G02F 2/004 |
| 2024/0103338 | A1* | 3/2024 | Kato | G02B 27/283 |
| 2024/0369904 | A1* | 11/2024 | Yoshino | H04J 14/0305 |

* cited by examiner

WAVELENGTH ADAPTER AND WAVELENGTH MODIFICATION METHOD

CROSS-REFERENCE TO RELATED APPLICATIONS

This application is a 371 U.S. National Phase of International Application No. PCT/JP2021/027531, filed on Jul. 26, 2021. The entire disclosure of the above application is incorporated herein by reference.

TECHNICAL FIELD

The present invention relates to a wavelength adapter and a wavelength modification method.

BACKGROUND ART

The All Photonics Network (APN) provides an end-to-end, full-mesh optical path. The APN uses an optical GW (Photonic Gateway) as one of optical nodes (see, for example, Non Patent Literature 1). The optical GW has a transmission/stop function of allowing for transmission of a signal light in accordance with opening of a line and stopping an unnecessary signal light.

CITATION LIST

Non Patent Literature

Non Patent Literature 1: Tomoaki Yoshida, "APN wo sasaeru Photonic Gateway to hikari access gijutsu (Photonic Gateway and Optical Access Technology Supporting APN)", NTT gijutsu journal (NTT Technical Journal), February 2021, p. 36-41

SUMMARY OF INVENTION

Technical Problem

In a case where a signal light having a wavelength other than a set wavelength is input for the purpose of avoiding an influence on other traffic, the optical GW blocks the signal light. For this reason, in a case where a wavelength shift of a signal light occurs, the signal light having the wavelength shift is blocked by a function of the optical GW. This has caused a problem in that traffic is not conducted.

In view of the above circumstances, it is an object of the present invention to provide a wavelength adapter and a wavelength modification method capable of modifying a wavelength shift of signal light.

Solution to Problem

An aspect of the present invention provides a wavelength adapter including: a first conversion unit that converts, by a first pump light, a first signal light into a second signal light having a wavelength not included in a target wavelength band while maintaining a phase relationship of the first signal light; a first filter that blocks the first signal light and the first pump light, and allows for transmission of the second signal light; a second conversion unit that converts, by a second pump light, the second signal light after transmission through the first filter into a third signal light having a wavelength in the target wavelength band while maintaining a phase relationship of the second signal light; and a second filter that blocks the second signal light and the second pump light, and allows for transmission of the third signal light.

An aspect of the present invention provides a wavelength modification method including: a first conversion step of converting, by a first pump light, a first signal light into a second signal light having a wavelength not included in a target wavelength band while maintaining a phase relationship of the first signal light; a first filtering step of blocking the first signal light and the first pump light, and allowing for transmission of the second signal light; a second conversion step of converting, by a second pump light, the second signal light after transmission in the first filtering step into a third signal light having a wavelength in the target wavelength band while maintaining a phase relationship of the second signal light; and a second filtering step of blocking the second signal light and the second pump light, and allowing for transmission of the third signal light.

Advantageous Effects of Invention

According to the present invention, it is possible to modify a wavelength shift of signal light.

DESCRIPTION OF EMBODIMENTS

Figure 1:
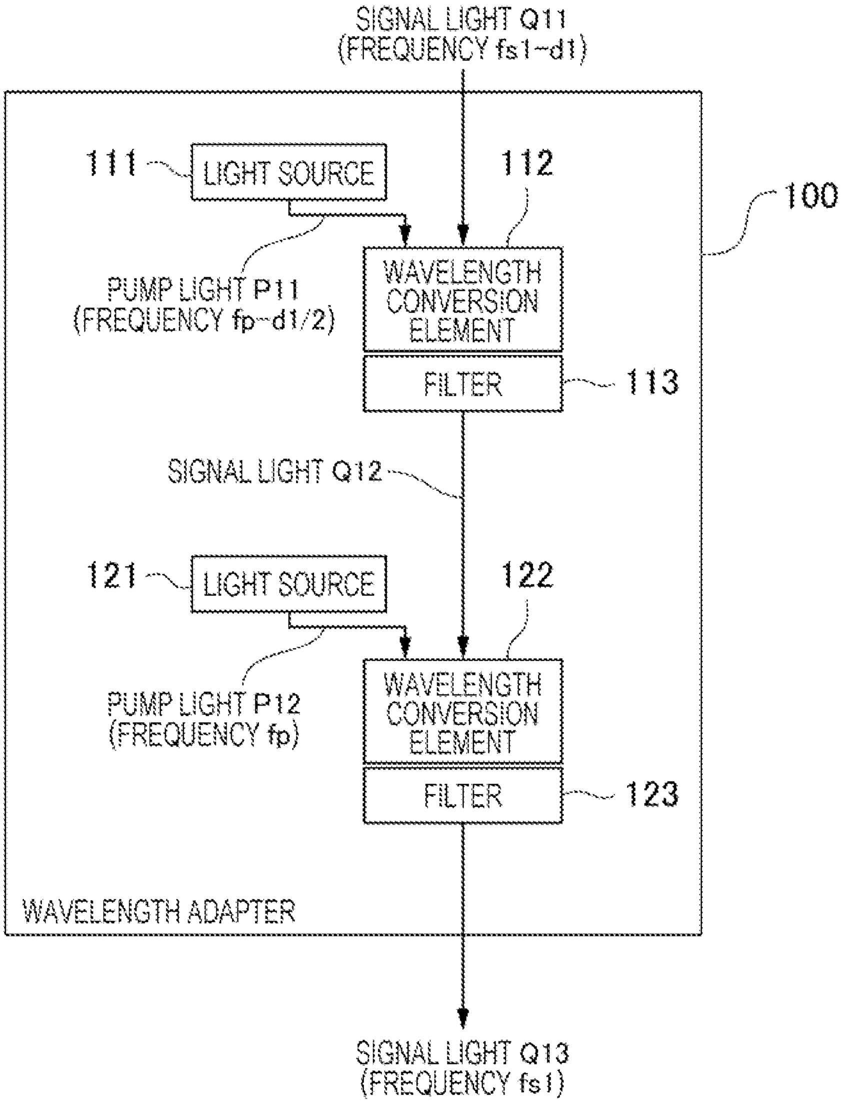
FIG. 1 is a configuration diagram of a wavelength adapter according to a first embodiment of the present invention.

Hereinafter, embodiments of the present invention will be described in detail with reference to the drawings. In the drawings, the same components are denoted by the same reference numerals, and the description thereof will be omitted.

A wavelength adapter of an embodiment of the present invention modifies a wavelength of a signal light by two-stage wavelength conversion. Modifying a wavelength means returning a wavelength that has shifted from a desired wavelength band occurs to a wavelength in the desired wavelength band.

Figure 27:
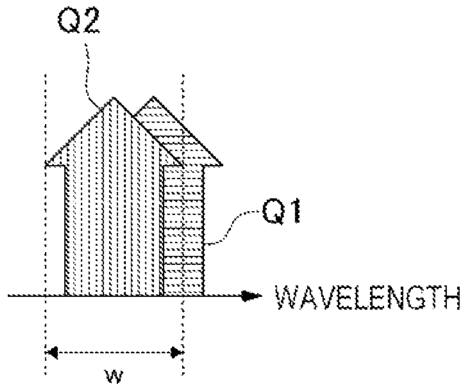
FIG. 27 is a diagram illustrating an example of a wavelength of a signal light before and after wavelength modification.

One of problems in modifying a wavelength is that, in a case where the wavelength shift is originally small, the signal light before the wavelength modification and the signal light after the wavelength modification overlap each other on a wavelength axis, and thus, these signal lights cannot be separated. FIG. 27 is a diagram illustrating an example of a wavelength of a signal light before and after wavelength modification. The most part of the wavelength of a signal light Q1 before modification is within a wavelength band w allowed for the signal light in a network including equipment such as an optical gateway (GW), and only a part of the wavelength is outside the wavelength band w. As will be described later, in wavelength conversion of a type in which phase information is maintained when the phase information is converted, both an original signal light and a signal light after conversion are often output together. From those signal lights, the original signal light is blocked and the signal light after conversion is extracted, and thus the wavelength conversion is performed. For this reason, when modification is performed such that the entire wavelength of the signal light Q1 is within the wavelength band w, the wavelength of the signal light Q1 before the modification and the wavelength of a signal light Q2 after the modification largely overlap with each other. In such a case, the signal light Q2 after the modification cannot be extracted. Thus, the wavelength adapter of the present embodiment once converts a signal light to be subjected to wavelength modification into a signal light having a wavelength that does not overlap the wavelength band w, which is the final target after the wavelength modification, on the wavelength axis, and then converts the converted signal light again into a signal light having a wavelength in the wavelength band w. As a result, wavelength-shifted traffic can be made to have a wavelength that does not affect other traffic and then conducted.

In addition to the above, in a case of modifying the wavelength of a signal light, phase information of the signal light needs to be maintained before and after the modification. For example, in a case of optical gate-type wavelength conversion by modulation or cross-phase modulation, phase information is lost due to the wavelength conversion. That is, the signal light does not become transparent before and after the wavelength conversion. For this reason, in the present embodiment, optical gate-type wavelength conversion is not adopted.

On the other hand, optical wave mixing-type wavelength conversion such as four-wave mixing and difference frequency generation allows phase information to be maintained. In this wavelength conversion, a wavelength of a spectrum shape is inverted, and a sign of phase time variation (chirp) is also inverted (phase conjugate). However, when the wavelength has been changed for an even number of times, the phase inversion is undone. For this reason, in the present embodiment, optical wave mixing-type wavelength conversion is adopted. Optical wave mixing-type wavelength conversion is described in, for example, Reference Document 1 below. In a case of cross-phase modulation type wavelength conversion, phase information is maintained. For this reason, in the present embodiment, cross-phase modulation type wavelength conversion may be adopted. Cross-phase modulation type wavelength conversion is described in, for example, Reference Document 2 below.

Reference Document 1: Eiichi Yamada and three others, "Wavelength Conversion of Optical Signal Using Side-Band Generation by RF Modulation", IEICE transactions C, Vol. J96-C, No. 10, pp. 265-274

Reference Document 2: Nobuyuki Matsuda, "Tan-itsu koshi no musonshitsu hacho henkan (Single-Photon Lossless Wavelength Conversion)", NTT gijutsu journal (NTT Technical Journal), May 2017, p. 15-19

In the following description, degenerate four-wave mixing will be described as an example of optical wave mixing-type wavelength conversion, and the same applies to a case where non-degenerate four-wave mixing, difference frequency generation, or cross-phase modulation is used. When the wavelength is denoted by $\lambda$ (m), the speed of light is denoted by c (m/s), and the frequency is denoted by f (Hz), a relationship expressed by $\lambda$ [m]=c [m/s]/f [Hz] is established. As described above, the wavelength and the frequency are mutually convertible, and it is therefore possible to identify the frequency by the wavelength, and identify the wavelength by the frequency. Similarly, a wavelength bandwidth and a frequency bandwidth are mutually convertible. Hereinafter, the frequency of an optical signal is also referred to as an optical frequency.

First Embodiment

FIG. 1 is a diagram illustrating a configuration example of a wavelength adapter 100 according to a first embodiment. The wavelength adapter 100 includes light sources 111 and 121, wavelength conversion elements 112 and 122, and filters 113 and 123.

The light source 111 generates a pump light P11 having a variable wavelength. The light source 121 generates a pump light P12 having a fixed wavelength or a variable wavelength. The pump light P11 is a first pump light, and the pump light P12 is a second pump light. Here, the light source 111 and the light source 121 respectively generate the pump light P11 and the pump light P12 by degenerate four-wave mixing. In a case where non-degenerate pump light is generated, the light source 111 and the light source 121 generate a plurality of pump lights. Therefore, in a case where wavelength conversion using a plurality of pump lights is performed, a pump light of the embodiment may be replaced with a pump light group. For example, the first pump light may be replaced with a first pump light group, and the second pump light may be replaced with a second pump light group. In a case where a pump light is replaced with a pump light group, a frequency relationship among the pump light group, the signal light, and an idler light may correspond to a frequency relationship among the pump light, the signal light, and the idler light. The wavelength adapter 100 may receive the pump light P11 from the outside, without being provided with the light source 111. The wavelength adapter 100 may receive the pump light P12 from the outside, without being provided with the light source 121. The wavelength (optical frequency) of the pump light P11 is set in accordance with a wavelength difference (optical frequency difference) to be converted. Here, the pump light P11 has a variable wavelength and the pump light P12 has a fixed wavelength or a variable wavelength, but the pump light P11 may have a fixed wavelength and the pump light P12 may have a variable wavelength.

The wavelength conversion element 112 and the wavelength conversion element 122 include a non-linear medium. The non-linear medium is an optical fiber, periodically poled lithium niobate (PPLN), semiconductor optical amplifier (SOA), or the like. In a case where the optical frequency corresponding to the wavelength of the pump light is fa and the optical frequency corresponding to the wavelength of the signal light is fb, the wavelength conversion element 112 and the wavelength conversion element 122 generate an idler light having a wavelength corresponding to an optical frequency (2fa−fb). The wavelength conversion element 112 receives the pump light P11 from the light source 111 and a signal light Q11 to be subjected to wavelength modification, and outputs a signal light Q12 as an idler light. The wavelength conversion element 122 receives the pump light P12 from the light source 121 and the signal light Q12 from the filter 113, and generates a signal light Q13 as an idler light. The signal light Q13 is a signal light in which the wavelength has been modified to a modification target wavelength. The modification target wavelength is referred to as a target wavelength. The frequency corresponding to the target wavelength is referred to as a target frequency.

The filter 113 blocks a wavelength band including the wavelength of the pump light P11 and the wavelength of the signal light Q11, and allows for transmission of a wavelength band including the wavelength of the signal light Q12. That is, the filter 113 blocks a frequency band including the frequency of the pump light P11 and the frequency of the signal light Q11, and allows for transmission of a frequency band including the frequency of the signal light Q12. The filter 123 blocks a wavelength band including the wavelength of the pump light P12 and the wavelength of the signal light Q12, and allows for transmission of a wavelength band including the wavelength of the signal light Q13. That is, the filter 123 blocks a frequency band including the frequency of the pump light P12 and the frequency of the signal light Q12, and allows for transmission of a frequency band including the frequency of the signal light Q13.

Figure 2:
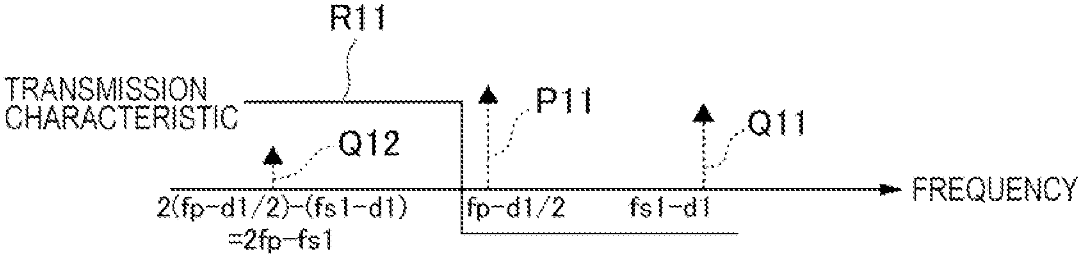
FIG. 2 is a diagram illustrating a transmission characteristic of a filter according to the embodiment.
Figure 3:
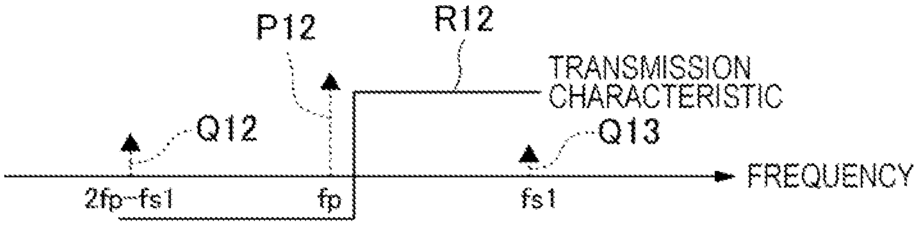
FIG. 3 is a diagram illustrating a transmission characteristic of a filter according to the embodiment.

FIG. 2 is a diagram illustrating a transmission characteristic of the filter 113, and FIG. 3 is a diagram illustrating a transmission characteristic of the filter 123. In the transmission characteristics, a line above a frequency axis means transmission, and a line below the frequency axis means blocking. While a blocking characteristic is expressed by an ideal step function, it is possible to adopt a blocking characteristic milder than the step function as long as transmission of light having a frequency indicated by an upward arrow in the transmission area is allowed and light having a frequency in the blocking area can be blocked. In a case where pump light groups are used and the pump light groups are arranged between a signal light and an idler light on the frequency axis, the signal light and the pump light groups may be blocked. In a case where an idler light is arranged in pump light groups on the frequency axis, it is possible to block each of a signal light and the pump light group on a side closer to the signal light than the idler light, and the pump light group on a side opposite to the side closer to the signal light than the idler light, and allow for transmission of the idler light. An operation of the wavelength adapter 100 will be described with reference to FIGS. 1 to 3. The wavelength adapter 100 modifies the wavelength of the signal light Q11 in which a wavelength shift has occurred to a target wavelength in a target wavelength band. A frequency corresponding to the target wavelength of the signal light Q11 is referred to as a target frequency fs1.

Pump lights and signal lights have a wavelength width (frequency width). An unmodulated pump light has a wavelength width corresponding to its line width. In addition to the line width, a signal light has a wavelength width corresponding to a modulation sideband. In a case of, for example, a signal light by direct modulation, the wavelength width is also affected by chirp. The center of the frequency of the signal light, the maximum peak of the spectrum, and the center of the spread of the modulation sideband do not coincide with each other in some cases. In such a case, a median of a full width at half maximum (FWHM, 3 dB width) of the spectrum of the signal light, a median of a 20 dB width of the spectrum of the signal light, a value at which the peak of the spectrum of the signal light is maximized, and a value in which the included portion of the modulation sideband or a main lobe of the modulation sideband included in the wavelength width (optical frequency width) allowed for the signal light is the largest are selected and regarded as the frequency or the wavelength of the signal light. The value in which the included portion is the largest is, for example, a value in which at least half of the modulation sideband on both sides or one side is included. The same applies to the embodiments described below.

The wavelength adapter 100 receives the signal light Q11 having a frequency (fs1−d1). That is, a frequency shift of d1 has occurred in the signal light Q11. The light source 111 generates the pump light P11 having a frequency (fp−d1/2). That is, the wavelength of the pump light P11 is a wavelength corresponding to a frequency shifted from a frequency fp of the pump light P12 by a frequency d1/2 determined in accordance with a frequency shift d1 between the frequency (fs1−d1) of the signal light Q11 and the target frequency fs1 in a target frequency band corresponding to the signal light Q11. That is, it can be said that the wavelength of the pump light P11 is determined in accordance with the shift between the wavelength of the signal light Q11 and the target wavelength of the signal light Q11.

The wavelength conversion element 112 receives the pump light P11 and the signal light Q11, and generates the signal light Q12 as an idler light. The frequency of the signal light Q12 is expressed by 2(fp−d1/2)−(fs1−d1)=2fp−fs1. The frequency (fp−d1/2) of the pump light P11 corresponds to the frequency fa, the frequency (fs1−d1) of the signal light Q11 corresponds to the frequency fb, and the frequency (2fp−fs1) of the signal light Q12 corresponds to the frequency (2fa−fb) of the idler light. The filter 113 receives the pump light P11, the signal light Q11, and the signal light Q12 from the wavelength conversion element 112.

As illustrated in FIG. 2, the filter 113 has a transmission characteristic R11 that allows for transmission of a frequency band including the frequency (2fp–fs1) and does not allow for transmission of a frequency band including the frequency (fs1–d1) and the frequency (fp–d1/2). The filter 113 blocks the pump light P11 and the signal light Q11, and outputs the signal light Q12 to the wavelength conversion element 122.

The light source 121 generates the pump light P12 having the frequency fp. The wavelength conversion element 122 receives the pump light P12 and the signal light Q12, and generates the signal light Q13 as an idler light. The frequency of the signal light Q13 is expressed by 2fp–(2fp–fs1)=fs1. The frequency fp of the pump light P12 corresponds to the frequency fa, the frequency (2fp–fs1) of the signal light Q12 corresponds to the frequency fb, and the frequency fs1 of the signal light Q13 corresponds to the frequency (2fa–fb) of the idler light. The filter 123 receives the pump light P12, the signal light Q12, and the signal light Q13 from the wavelength conversion element 122.

As illustrated in FIG. 3, the filter 123 has a transmission characteristic R12 that allows for transmission of a frequency band including the frequency fs1 and does not allow for transmission of a frequency band including the frequency (2fp–fs1) and the frequency fp. The filter 123 blocks the pump light P12 and the signal light Q12, and outputs the signal light Q13 having a wavelength modified to a target wavelength corresponding to the target frequency fs1.

As described above, the wavelength conversion element 122 in the subsequent stage receives the pump light and the idler light that has been output from the wavelength conversion element 112 in the preceding stage, and outputs a signal light after modification. Thus, the wavelength of the signal light can be modified.

In FIG. 2, the pump light P11 has a variable wavelength in accordance with the frequency shift d1, and the pump light P12 has a fixed wavelength. However, as long as a frequency relationship in which the frequency (fs1–d1) of the signal light Q11 is converted into the target frequency fs1 is maintained, both the pump light P11 and the pump light P12 may have a variable wavelength, or the pump light P11 may have a fixed wavelength and the pump light P12 may have a variable wavelength. For example, in the latter case, when the pump light P11 has a fixed optical frequency fp', the pump light P12 may have a frequency of fp'+d/2. That is, the frequency of the signal light Q12 is expressed by 2fp'–(fs1–d1), and the frequency of the signal light Q13 is expressed by 2(fp'+d/2)–{2fp'–(fs1–d1)}=fs1.

While one signal light is to be subjected to wavelength modification in the above example, a plurality of signal lights may be subjected to wavelength modification depending on the wavelength relationship between the signal lights to be subjected to wavelength modification. Examples of a case where wavelength regions of converted lights after wavelength modification have a predetermined relationship include a case where the full width at half maximum (3 dB width) and the 20 dB width of the spectra of idler lights of all grids generated by inputting signal lights of a plurality of wavelength grids and pump lights having the same frequency (fp–d1/2) to a wavelength conversion element, the modulation sideband or the main lobe of the modulation sideband, and at least half of the main lobe are included in the full width at half maximum (3 dB width) for which the filter 113 is transmissive and the 20 dB width.

Figure 4:
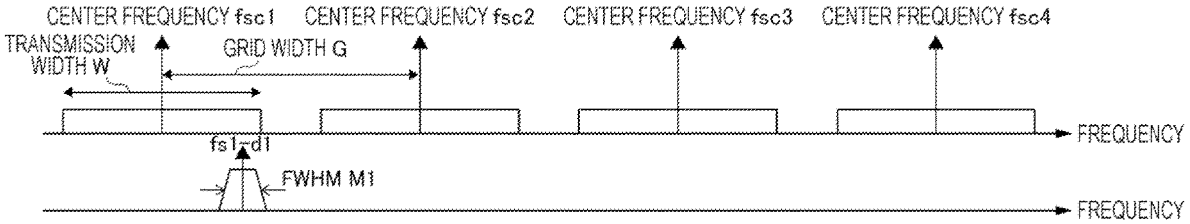
FIG. 4 is a diagram illustrating a transmission width of a filter according to the embodiment.

FIG. 4 is a diagram illustrating a transmission width of the filter 113 in a case where a plurality of signal lights is to be modified. A plurality of signal lights Q11 is referred to as signal lights Q11-1 to Q11-N. A signal light Q13 generated by performing wavelength conversion on a signal light Q11-*n* (n is an integer of 1 or more and N or less) is referred to as a signal light Q13-*n*. Each of the signal lights Q11-1 to Q11-N is a signal light of the corresponding grid with a grid interval of G. The frequency of the signal light Q11-*n* is fsn–dn. The FWHM of the signal light Q11-*n* is Mn. A center frequency of a target frequency band of the signal light Q11-*n* is fscn. The target frequency band is a frequency band corresponding to a target wavelength band. The filter 123 allows for transmission of light having a transmission width W centered on the center frequency fscn.

A case where n=1 holds will be described as an example.

In a case where the following Formula (1) is satisfied, wavelength conversion of the signal light Q11-1 is not required, and in a case where the following Formula (2) or (3) is satisfied, conversion of the signal light Q11-1 is required.

$$-(W/2 - M1/2) \le fsc1 - (fs1 - d1) \le (W/2 - M1/2) \tag{1}$$

$$fsc1 - (fs1 - d1) \le -(W/2 - M1/2) \tag{2}$$

$$(W/2 - M1/2) \le fsc1 - (fs1 - d1) \tag{3}$$

An allowable range of a signal light Q13-1 is expressed by the following Formula (4).

$$fsc1 - (W/2 - M1/2) \le fs1 \le fsc1 + (W/2 - M1/2) \tag{4}$$

Examples of n=2 and n=3 will be described.

A condition under which the pump light P11 and the pump light P12 can be shared by a target frequency fs2 and a target frequency fs3 is expressed by the following Formula (7) obtained from Formulas (5) and (6).

$$fsc2 - (W/2 - M2/2) \le fs2 \le fsc2 + (W/2 - M2/2) \tag{5}$$

$$fsc3 - (W/2 - M3/2) \le fs3 \le fsc3 + (W/2 - M3/2) \tag{6}$$

$$-(W/2 - M3/2) \le d2 - d3 \le (W/2 - M3/2) \tag{7}$$

In a case where a condition similar to Formula (7) is satisfied in adjacent signal lights among the signal lights Q11-1 to Q11-N, the same pump light P11 and pump light P12 can be shared. While a spectral width of the FWHM is used in the above description, 50% or more of the main lobe of the modulation sideband is required according to the Shannon's theorem. While a half width is used as the width of M here, it is possible to use a width that includes 80%, for example. This is because, in baseband modulation, a signal is cut out to about 70% to 80% by an electrical low-pass filter after photoelectric conversion.

Figure 5:
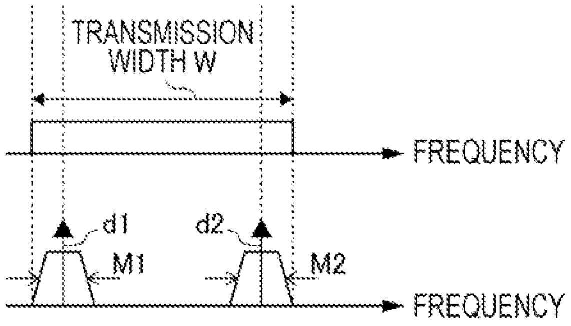
FIG. 5 is a diagram illustrating a transmission width of a filter according to the embodiment.

Note that the above conditions vary depending on whether the transmission is double side band transmission or single side band transmission. FIG. 5 is a diagram illustrating a transmission width W for which the filter 123 is transmissive in a case of double side band transmission. In a case of double side band transmission, modulation sidebands on both sides are normally included as in the following Formula (8). Here, m≠n holds, and m is an integer of 1 or more and N or less. FIG. 5 illustrates an example in which n=1 and m=2 hold.

$$|dn - dm| + Mn/2 + Mm/2 \leq W \quad (8)$$

For simple operation without considering the frequency relationship between a plurality of signal lights, the frequency (fsn−dn) of an input light is converted by the following Formula (9).

$$fsn - dn = fscn - (dn + fscn - fsn) = fscn - dn' \quad (9)$$

A frequency (fsm−dm) of an input light is also converted in a similar manner to the above Formula (9). In a case where the following Formula (10) is satisfied, the pump light P11 and the pump light P12 can be shared.

$$|dn' + Mn/2| \leq W/2 \; |dm' - Mm/2| \leq W/2 \quad (10)$$

Figure 6:
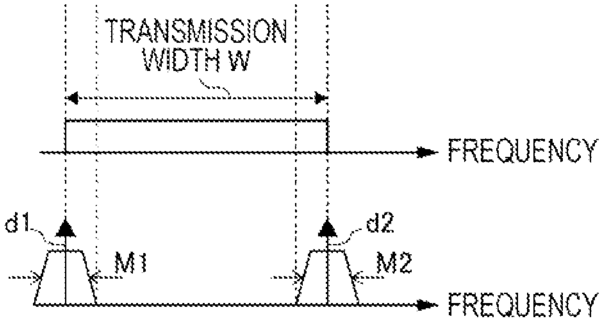
FIG. 6 is a diagram illustrating a transmission width of a filter according to the embodiment.

FIG. 6 is a diagram illustrating a transmission width W for which the filter 123 is transmissive in a case where double side band transmission is used and an equalizer on a receiving side can be applied. In a case where the equalizer on the receiving side can be applied, the following Formula (11) may be satisfied so that the modulation sideband on one side is included. FIG. 6 illustrates an example in which n=1 and m=2 hold.

$$|dn - dm| \leq W \quad (11)$$

Figure 7:
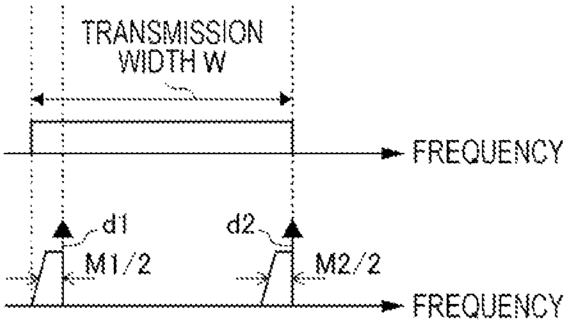
FIG. 7 is a diagram illustrating a transmission width of a filter according to the embodiment.

FIG. 7 is a diagram illustrating a transmission width W for which the filter 123 is transmissive in a case of single side band transmission. In a case of single side band transmission including suppressed carrier single side band transmission, a side band for transmitting a signal light may be included in the transmission width W. For example, in a case of using side bands on opposite sides, outward side bands may be included in the transmission width W as in FIG. 5, and in a case of using side bands facing each other, inward side bands may be included in the transmission width W as in FIG. 6. In a case where side bands on the same side are used in which one signal light is outward and the other signal light is inward, the following Formula (12) or Formula (13) may be satisfied.

As illustrated in FIG. 7, in a case where the modulation sideband of M1 is outward and the modulation sideband of M2 is inward, Formula (12) may be satisfied. The modulation sideband of M1 is on the opposite side of a shared carrier. FIG. 7 illustrates an example in which n=1 and m=2 hold.

$$|dn - dm| + Mn/2 \leq W \quad (12)$$

Conversely, in a case where the modulation sideband of M1 is outward and the modulation sideband of M2 is inward, Formula (13) may be satisfied.

$$|dn - dm| + Mm/2 \leq W \quad (13)$$

Figure 8:
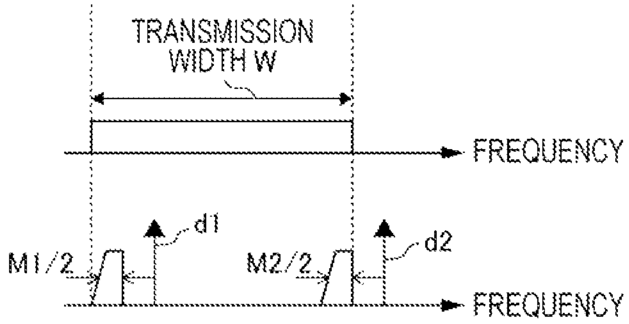
FIG. 8 is a diagram illustrating a transmission width of a filter according to the embodiment.

FIG. 8 is a diagram illustrating a transmission width for which the filter 123 is transmissive in a case of transmission that is suppressed carrier single side band transmission and is not baseband transmission. In a case of SCM or the like, not baseband transmission, a frequency band for transmitting a signal may be included in the transmission width W as illustrated in FIG. 8.

The filter 113 has a transmission characteristic that allows for transmission of a fixed band, but the transmission characteristic may be variable as long as the signal light Q12 as an idler light generated in the wavelength conversion element 112 can be conducted and the signal light Q11 and the pump light P11 can be blocked. Similarly, the filter 123 has a transmission characteristic that allows for transmission of a fixed band, but the transmission characteristic may be variable as long as the signal light Q13 as an idler light generated in the wavelength conversion element 122 can be conducted and the signal light Q12 and the pump light P12 can be blocked. In a case of a transmission characteristic that allows for transmission of a fixed band, the closer the boundary between transmission and blocking is to the pump light, the more the wavelength grid that can be modified increases.

In a case where an optical amplifier is used for the wavelength adapter 100, in order to avoid an influence of amplified spontaneous emission (ASE) noise, it is desirable to use a variable filter capable of selecting a transmission wavelength such that the filter 113 allows for transmission of only the wavelength of the signal light Q12 and the filter 123 allows for transmission of only the wavelength of the signal light Q13.

In a case where a signal light to be subjected to wavelength modification is a signal subjected to wavelength division multiplexing (WDM) and the wavelength adapter 100 outputs the wavelength-multiplexed signal light as it is, the filters 113 and 123 may have a configuration in which wavelength conversion is performed after a transmission wavelength is branched by an arrayed-waveguide grating (AWG) or the like that matches the wavelength grid, and then multiplexing is performed by the AWG or the like after the conversion. As the filters 113 and 123, it is possible to use Mach-Zehnder (MZ) filters in which the grid interval and the period of the transmission wavelength coincide with each other. However, in this case, transmission of ASE noise, for which the AWG or the MZ filter is transmissive, is allowed regardless of whether wavelength modification has been performed, and thus the ASE noise acts as noise for signals and the like that are not to be modified.

The same applies to the following embodiments.

Second Embodiment

In the first embodiment, the wavelength of a signal light of one user is modified by using two conversion elements: a wavelength conversion element in the preceding stage and a wavelength conversion element in the subsequent stage. In the present embodiment, in order to modify the wavelengths of signal lights of a plurality of users, the same number of wavelength conversion elements as the users for which wavelength modification is to be performed are provided in the preceding stage, and a wavelength conversion element in the subsequent stage is shared by the plurality of users.

Figure 9:
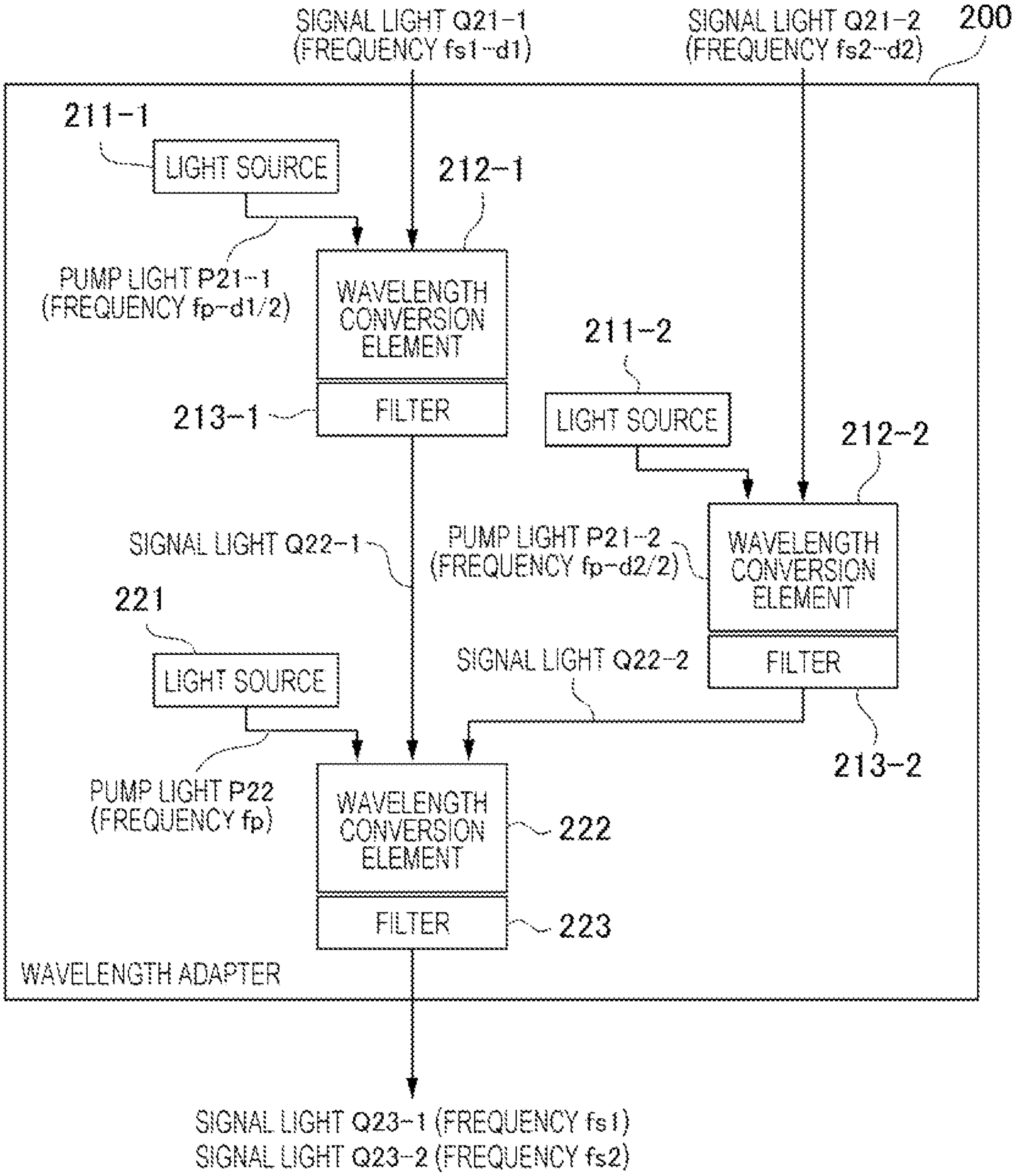
FIG. 9 is a configuration diagram of a wavelength adapter according to a second embodiment.

FIG. 9 is a diagram illustrating a configuration example of a wavelength adapter 200 according to a second embodiment. The wavelength adapter 200 includes light sources 211-1 to 211-N and 221, wavelength conversion elements 212-1 to 212-N and 222, and filters 213-1 to 213-N and 223.

N is an integer of 2 or more. In the present embodiment, a case where N=2 holds will be described as an example.

A light source 211-*n* (n is an integer of 1 or more and N or less) generates a pump light P21-*n* having a variable wavelength by degenerate four-wave. The light source 221 generates a pump light P22 having a fixed wavelength or a variable wavelength by degenerate four-wave. The pump light P21-*n* is a first pump light, and the pump light P22 is a second pump light. In a case where non-degenerate pump light is generated, the light sources 211-1 to 211-N and 221 generate a plurality of pump lights. The wavelength adapter 200 may receive the pump light P21-*n* from the outside, without being provided with the light source 211-*n*. The wavelength adapter 200 may receive the pump light P22 from the outside, without being provided with the light source 221.

The wavelength conversion elements 212-1 to 212-N and 222 are non-linear media similar to the wavelength conversion elements 112 and 122 of the first embodiment. A wavelength conversion element 212-*n* receives the pump light P21-*n* from the light source 211-*n* and a signal light Q21-*n* to be subjected to wavelength modification, and outputs a signal light Q22-*n* as an idler light. The wavelength conversion element 222 receives the pump light P22 from the light source 221 and signal lights Q22-1 to Q22-N from the filters 213-1 to 213-N, respectively, and outputs signal lights Q23-1 to Q23-N. A signal light Q23-*n* is an idler light generated from the pump light P22 and the signal light Q22-*n*. The signal light Q23-*n* is the signal light Q21-*n* having a wavelength modified to a target wavelength in a target wavelength band.

A filter 213-*n* blocks a wavelength band including the wavelength of the pump light P21-*n* and the wavelength of the signal light Q21-*n*, and allows for transmission of a wavelength band including the wavelength of the signal light Q22-*n*. That is, the filter 213-*n* blocks a frequency band including the frequency of the pump light P21-*n* and the frequency of the signal light Q21-*n*, and allows for transmission of a frequency band including the frequency of the signal light Q22-*n*. The filter 223 blocks a wavelength band including the wavelength of the pump light P22 and the wavelengths of the signal lights Q22-1 to Q22-N, and allows for transmission of a wavelength band including the wavelengths of the signal lights Q23-1 to Q23-N. That is, the filter 223 blocks a frequency band including the frequency of the pump light P22 and the frequencies of the signal lights Q22-1 to Q22-N, and allows for transmission of a frequency band including the frequencies of the signal lights Q23-1 to Q23-N.

Figure 10:
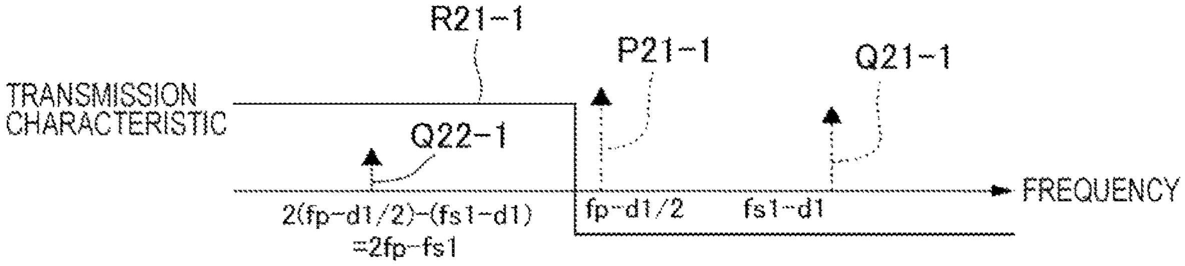
FIG. 10 is a diagram illustrating a transmission characteristic of a filter according to the embodiment.
Figure 11:
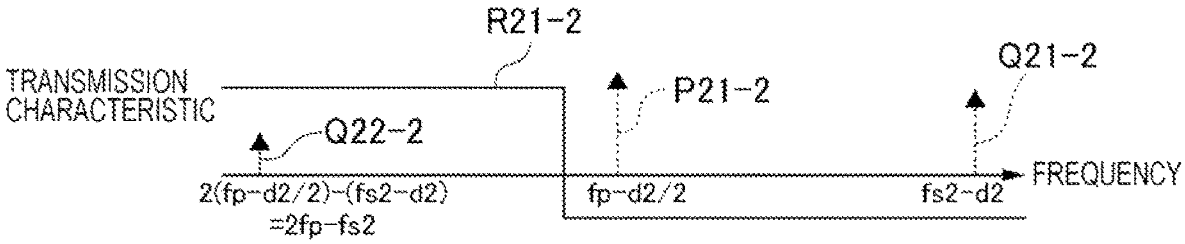
FIG. 11 is a diagram illustrating a transmission characteristic of a filter according to the embodiment.
Figure 12:
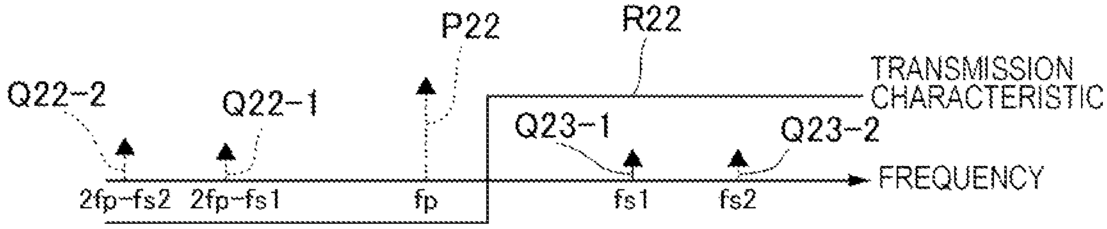
FIG. 12 is a diagram illustrating a transmission characteristic of a filter according to the embodiment.

FIG. 10 is a diagram illustrating a transmission characteristic of the filter 213-1, FIG. 11 is a diagram illustrating a transmission characteristic of the filter 213-2, and FIG. 12 is a diagram illustrating a transmission characteristic of the filter 223. An operation of the wavelength adapter 200 will be described with reference to FIGS. 9 to 12. The wavelength adapter 200 modifies the signal light Q21-*n* in which a wavelength shift has occurred to a target wavelength in a target wavelength band. The frequency corresponding to the target wavelength of the signal light Q21-*n* is referred to as a target frequency fsn.

The wavelength adapter 200 receives the signal light Q21-*n* having a frequency (fsn−dn). That is, a frequency shift of dn has occurred in the signal light Q21-*n*. The light source 211-*n* generates the pump light P21-*n* having a frequency (fp−dn/2). That is, the frequency of the pump light P21-*n* is a frequency shifted from a frequency fp of the pump light P22 by a frequency dn/2 determined in accordance with a shift dn between the frequency (fsn−dn) of the signal light Q21-*n* and the target frequency fsn in a target frequency band corresponding to the signal light Q21-*n*. The wavelength conversion element 212-*n* receives the pump light P21-*n* and the signal light Q21-*n*, and generates the signal light Q22-*n* as an idler light. The frequency of the signal light Q22-*n* is expressed by 2(fp−dn/2)−(fsn−dn)=2fp−fsn. The filter 213-*n* receives the pump light P21-*n*, the signal light Q21-*n*, and the signal light Q22-*n* from the wavelength conversion element 212-*n*.

The filter 213-*n* has a transmission characteristic that allows for transmission of a frequency band including the frequency (2fp−fsn) and does not allow for transmission of a frequency band including the frequency (fsn−dn) and the frequency (fp−dn/2). The filter 213-*n* blocks the pump light P21-*n* and the signal light Q21-*n*, and outputs the signal light Q22-*n*.

Specifically, the wavelength conversion element 212-1 receives a pump light P21-1 having a frequency (fp−d1/2) output from the light source 211-1 and a signal light Q21-1 having a frequency (fs1−d1) to be subjected to wavelength modification, and generates the signal light Q22-1 having the frequency 2fp−fs1, which is an idler light. As illustrated in FIG. 10, the filter 213-1 has a transmission characteristic R21-1 that allows for transmission of an optical frequency band including the frequency (2fp−fs1) and does not allow for transmission of an optical frequency band including the frequency (fs1−d1) and the frequency (fp−d1/2). The filter 213-1 blocks the pump light P21-1 and the signal light Q21-1, and outputs the signal light Q22-1.

Similarly, the wavelength conversion element 212-2 receives a pump light P21-2 having a frequency (fp−d2/2) output from the light source 211-2 and a signal light Q21-2 having a frequency (fs2−d2) to be subjected to wavelength modification, and generates the signal light Q22-2 having the frequency 2fp−fs2, which is an idler light. As illustrated in FIG. 11, the filter 213-2 has a transmission characteristic R21-2 that allows for transmission of an optical frequency band including the frequency (2fp−fs2) and does not allow for transmission of an optical frequency band including the frequency (fs2−d2) and the frequency (fp−d2/2). The filter 213-2 blocks the pump light P21-2 and the signal light Q21-2, and outputs the signal light Q22-2.

The light source 221 generates the pump light P22 having the frequency fp. The wavelength conversion element 222 receives the pump light P22 and the signal lights Q22-1 to Q22-N, and generates the signal lights Q23-1 to Q23-N as idler lights. The frequency of the signal light Q23-*n* is expressed by 2fp−(2fp−fsn)=fsn. The filter 223 receives the pump light P22, the signal lights Q22-1 to Q22-N, and the signal lights Q23-1 to Q23-N from the wavelength conversion element 222.

As illustrated in FIG. 12, the filter 223 has a transmission characteristic R22 that allows for transmission of an optical frequency band including frequencies fs1 to fsN and does not allow for transmission of an optical frequency band including the frequencies (2fp−fs1) to (2fp−fsN) and the frequency fp. The filter 223 blocks the pump light P22 and the signal lights Q22-1 to Q22-N, and outputs the signal lights Q23-1 to Q23-N. As a result, the filter 223 outputs the signal light Q23-1 having a wavelength modified to a target wavelength corresponding to the target frequency fs1 and the signal light Q23-2 having a wavelength modified to a target wavelength corresponding to a target frequency fs2. Note that the filter 223 may output a signal light obtained by multiplexing the signal lights Q23-1 to Q23-N, or may output the signal lights Q23-1 to Q23-N with all or some of the signal lights separated.

As described above, the wavelength adapter 200 can modify the wavelengths of a plurality of signal lights. In addition, the wavelength adapter 200 of the present embodiment includes the wavelength conversion elements, one for each wavelength, in the preceding stage, and a wavelength conversion element shared by a plurality of wavelengths in the subsequent stage. For this reason, in a case of two wavelengths, four wavelength conversion elements are required in the first embodiment, but the number of wavelength conversion elements can be reduced to three in the present embodiment. In addition, in a case of three wavelengths, six wavelength conversion elements are required in the first embodiment, but the number of wavelength conversion elements can be reduced to four in the present embodiment.

As described above, the wavelength adapter 200 of the present embodiment includes, for each signal light Q21-*n* to be subjected to wavelength modification, the light source 211-*n* that generates a pump light P21 having a variable wavelength, the wavelength conversion element 212-*n*, and the filter 213-*n* that blocks the signal light Q21-*n* and the pump light P21 in the preceding stage. The wavelength adapter 200 inputs again, to the wavelength conversion element 222 in the subsequent stage, the signal lights Q22-1 to Q22-N as idler lights respectively output from the wavelength conversion elements 212-1 to 212-N in the preceding stage, together with the pump light P22 of the light source 221. The wavelength conversion element 222 outputs the signal lights Q23-1 to Q23-N in which the wavelengths have been modified. The filter 223 in the subsequent stage blocks the signal lights Q22-1 to Q22-N as idler lights output from the wavelength conversion elements 212-1 to 212-N in the preceding stage and the pump light P22, and outputs the signal lights Q23-1 to Q23-N after wavelength modification.

In a case where the wavelength conversion element in the subsequent stage is shared as described above, the wavelength region of the target wavelength is made not to overlap with the wavelength of the pump light to be blocked and the wavelength of the idler lights generated in mid-flow. The filters 213-1 to 213-N in the preceding stage block signal lights Q21-1 to Q21-N to be subjected to wavelength modification and pump lights P21-1 to P21-N in the preceding stage, and allows for transmission of idler lights. The filter 223 in the subsequent stage blocks the signal lights Q22-1 to Q22-N, which are idler lights in the preceding stage and the pump light P22 in the subsequent stage, and allows for transmission of signal lights after wavelength modification. The filter 223 in the subsequent stage has a transmission characteristic illustrated in FIG. 4, and the frequency can be adjusted by the pump lights P21-1 to P21-N in the preceding stage. For this reason, in a case where there is one signal light to be subjected to wavelength modification in each of the wavelength conversion elements 212-1 to 212-N in the preceding stage, there is no restriction in sharing the pump lights P21-1 to P21-N in the preceding stage. In a case where a plurality of signal lights Q21-*n* to be subjected to wavelength modification is input to the wavelength conversion element 212-*n* in the preceding stage, the plurality of signal lights Q21-*n* has a restriction similar to that in a case where a plurality of signal lights Q11 to be subjected to wavelength modification is input to the wavelength adapter 100 of the first embodiment.

The multiplexing number N can be any number as long as a loss due to multiplexing and a gain restriction are within allowable ranges. In FIG. 9, it is assumed that a light after wavelength modification conforms with the wavelength grid, and the wavelength of a pump light is adjusted so that an idler light in the preceding stage also conforms with the wavelength grid. For this reason, idler lights can be concentrated by an AWG or the like that matches the wavelength grid at the time of wavelength conversion in the subsequent stage, and it is therefore possible to avoid a loss caused by splitting by a coupler at the time of concentration.

Third Embodiment

In a wavelength adapter of the present embodiment, a plurality of users shares a wavelength conversion element in the preceding stage, and idler lights as signal lights of the individual users are wavelength-separated. The wavelength-separated idler lights are input to wavelength conversion elements corresponding to the individual users in the subsequent stage.

Figure 13:
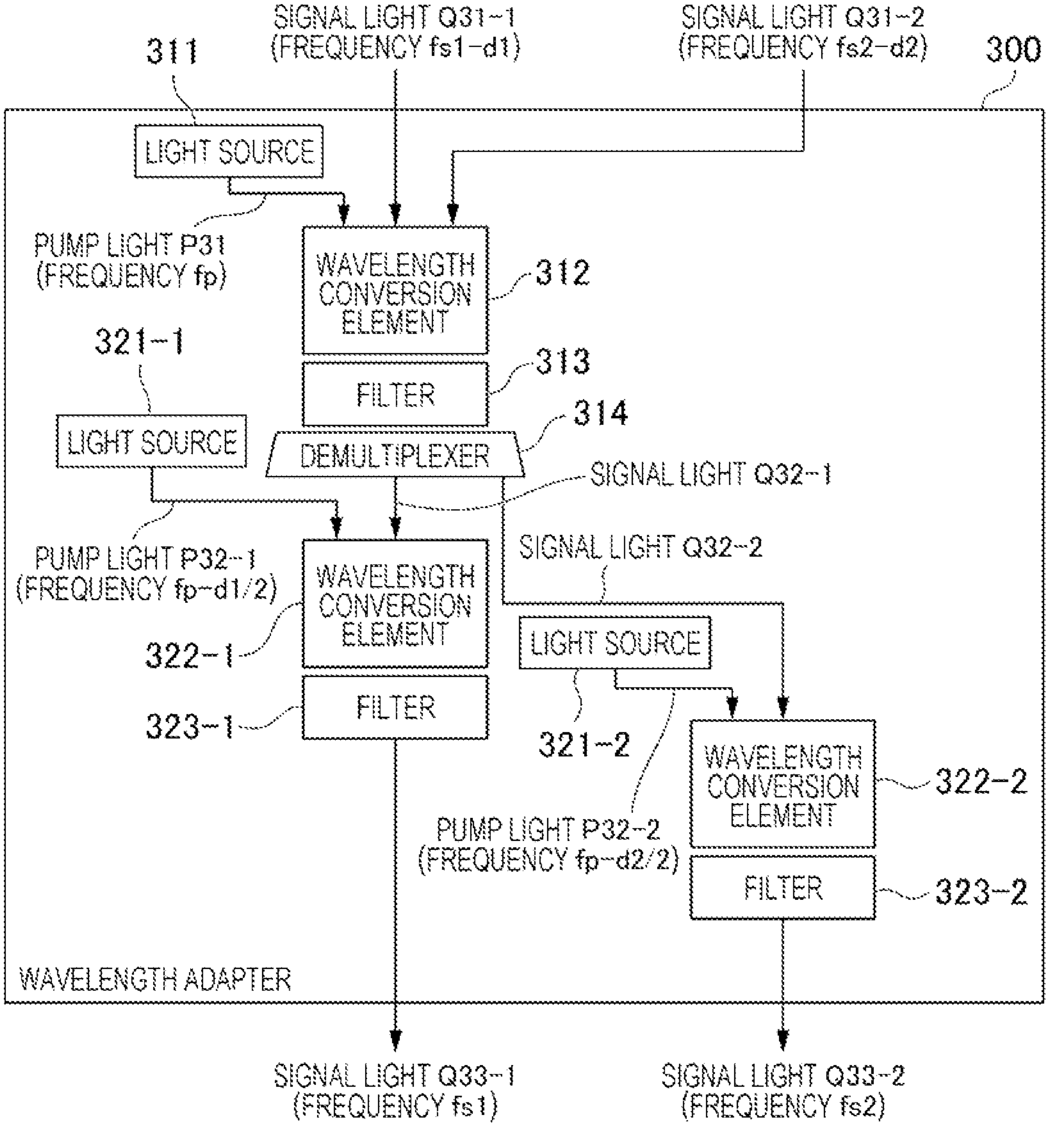
FIG. 13 is a configuration diagram of a wavelength adapter according to a third embodiment.

FIG. 13 is a diagram illustrating a configuration example of a wavelength adapter 300 according to a third embodiment. The wavelength adapter 300 includes light sources 311 and 321-1 to 321-N, wavelength conversion elements 312 and 322-1 to 322-N, filters 313 and 323-1 to 323-N, and a demultiplexer 314. N is an integer of 2 or more. In the present embodiment, a case where N=2 holds will be described as an example.

The light source 311 generates a pump light P31 having a fixed wavelength or a variable wavelength by degenerate four-wave. A light source 321-*n* (n is an integer of 1 or more and N or less) generates a pump light P32-*n* having a variable wavelength by degenerate four-wave. The pump light P31 is a first pump light, and the pump light P32-*n* is a second pump light. In a case where non-degenerate pump light is generated, the light sources 311 and 321-1 to 321-N generate a plurality of pump lights. The wavelength adapter 300 may receive the pump light P31 from the outside, without being provided with the light source 311. The wavelength adapter 300 may receive the pump light P32-*n* from the outside, without being provided with the light source 321-*n*.

The wavelength conversion elements 312 and 322-1 to 322-N are non-linear media similar to the wavelength conversion elements 112 and 122 of the first embodiment. The wavelength conversion element 312 receives the pump light P31 from the light source 311 and signal lights Q31-1 to Q31-N to be subjected to wavelength modification, and outputs signal lights Q32-1 to Q32-N. A signal light Q32-*n* is an idler light generated on the basis of the pump light P31 and a signal light Q31-*n*. A wavelength conversion element 322-*n* receives the pump light P32-*n* from the light source 321-*n* and the signal light Q32-*n* from the demultiplexer 314, and outputs a signal light Q33-*n* as an idler light.

The filter 313 blocks a wavelength band including the wavelength of the pump light P31 and the wavelengths of the signal lights Q31-1 to Q31-N, and allows for transmission of a wavelength band including the wavelengths of the signal lights Q32-1 to Q32-N. That is, the filter 313 blocks a frequency band including the frequency of the pump light P31 and the frequencies of the signal lights Q31-1 to Q31-N, and allows for transmission of a frequency band including the frequencies of the signal lights Q32-1 to Q32-N. A filter 323-*n* blocks a wavelength band including the wavelength of the pump light P32-*n* and the wavelength of the signal light Q32-*n*, and allows for transmission of a wavelength band including the wavelength of the signal light Q33-*n*. That is, the filter 323-*n* blocks a frequency band including the frequency of the pump light P32-*n* and the frequency of the signal light Q32-*n*, and allows for transmission of a frequency band including the frequency of the signal light Q33-*n*.

The demultiplexer 314 wavelength-separates the signal lights Q32-1 to Q32-N output from the filter 313. The demultiplexer 314 inputs the signal light Q32-*n* to the wavelength conversion element 322-*n*.

Figure 14:
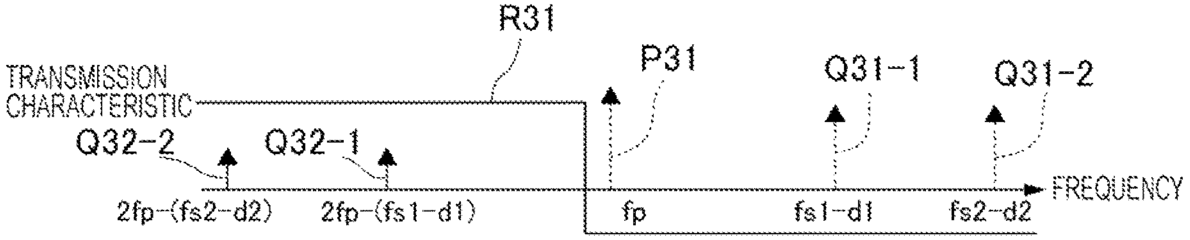
FIG. 14 is a diagram illustrating a transmission characteristic of a filter according to the embodiment.
Figure 15:
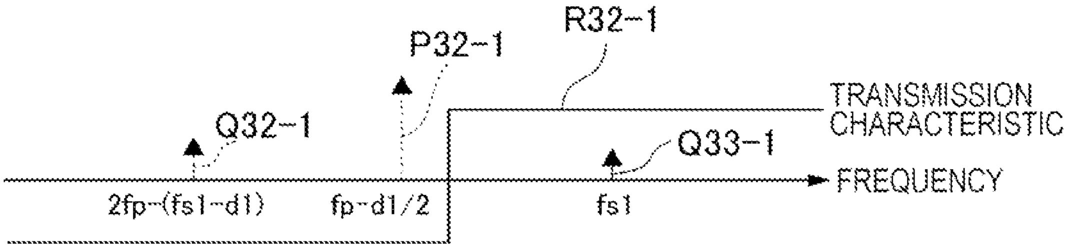
FIG. 15 is a diagram illustrating a transmission characteristic of a filter according to the embodiment.
Figure 16:
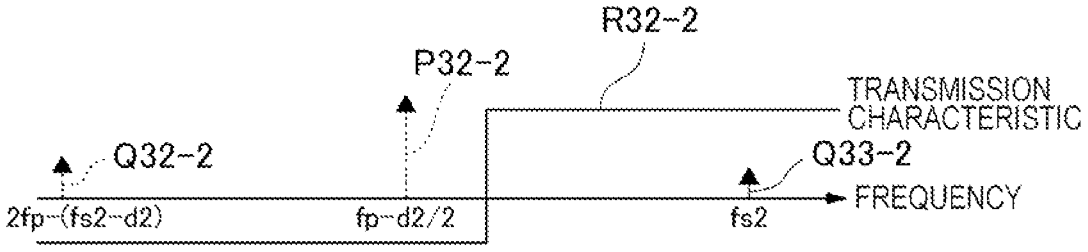
FIG. 16 is a diagram illustrating a transmission characteristic of a filter according to the embodiment.

FIG. 14 is a diagram illustrating a transmission characteristic of the filter 313, FIG. 15 is a diagram illustrating a transmission characteristic of the filter 323-1, and FIG. 16 is a diagram illustrating a transmission characteristic of the filter 323-2. An operation of the wavelength adapter 300 will be described with reference to FIGS. 13 to 16. The wavelength adapter 300 modifies the signal light Q31-*n* in which a wavelength shift has occurred to a target wavelength in a target wavelength band. The frequency corresponding to the target wavelength of the signal light Q31-*n* is referred to as a target frequency fsn.

The wavelength adapter 300 receives the signal light Q31-*n* having a frequency (fsn−dn). The light source 311 generates the pump light P31 having a frequency fp. The wavelength conversion element 312 receives the pump light P31 and the signal lights Q31-1 to Q31-N, and generates the signal lights Q32-1 to Q32-N as idler lights. The frequency of the signal light Q32-*n* is expressed by 2fp−(fsn−dn). The filter 313 receives the pump light P31, the signal lights Q31-1 to Q31-N, and the signal lights Q32-1 to Q32-N from the wavelength conversion element 312.

As illustrated in FIG. 14, the filter 313 has a transmission characteristic R31 that allows for transmission of a frequency band including frequencies 2fp−(fs1−d1) to 2fp−(fsN−dN) and does not allow for transmission of a frequency band including the frequency fp and frequencies (fs1−d1) to (fsN−dN). The filter 313 blocks the pump light P31 and the signal lights Q31-1 to Q31-N, and outputs the signal lights Q32-1 to Q32-N. The demultiplexer 314 wavelength-separates the signal lights Q32-1 to Q32-N output from the filter 313. The demultiplexer 314 inputs the wavelength-separated signal light Q32-*n* to the wavelength conversion element 322-*n*.

The light source 321-*n* generates the pump light P32-*n* having a frequency (fp−dn/2). That is, the frequency of the pump light P32-*n* for converting the signal light Q33-*n* into the signal light Q32-*n* is a frequency shifted from the frequency fp of the pump light P31 by a frequency dn/2 determined in accordance with a shift dn between a target frequency fn in a target frequency band corresponding to the signal light Q31-*n* converted into the signal light Q32-*n* and the frequency (fsn−dn) of the signal light Q31-*n*. The wavelength conversion element 322-*n* receives the pump light P32-*n* and the signal light Q32-*n*, and generates the signal light Q33-*n* as an idler light. The frequency of the signal light Q33-*n* is fsn. The filter 323-*n* receives the pump light P32-*n*, the signal light Q32-*n*, and the signal light Q33-*n* from the wavelength conversion element 322-*n*.

The filter 323-*n* has a transmission characteristic that allows for transmission of a frequency band including the frequency fsn and does not allow for transmission of a frequency band including the frequency (fp−dn/2) and the frequency 2fp−(fsn−dn). The filter 323-*n* blocks the pump light P32-*n* and the signal light Q32-*n*, and outputs the signal light Q33-*n*.

Specifically, the wavelength conversion element 322-1 receives a pump light P32-1 having a frequency (fp−d1/2) output from the light source 321-1 and the signal light Q32-1 separated by the demultiplexer 314, and generates a signal light Q33-1 having a frequency fs1. As illustrated in FIG. 15, the filter 323-1 has a transmission characteristic R32-1 that allows for transmission of a frequency band including the frequency fs1 and does not allow for transmission of a frequency band including the frequencies 2fp−(fs1−d1) and (fp−d1/2). The filter 323-1 blocks the pump light P32-1 and the signal light Q32-1, and outputs the signal light Q33-1 having a wavelength modified to a target wavelength corresponding to the target frequency fs1.

Similarly, the wavelength conversion element 322-2 receives a pump light P32-2 having a frequency (fp−d2/2) output from the light source 321-2 and the signal light Q32-2 separated by the demultiplexer 314, and generates a signal light Q33-2 having a frequency fs2. As illustrated in FIG. 16, the filter 323-2 has a transmission characteristic R32-2 that allows for transmission of a frequency band including the frequency fs2 and does not allow for transmission of a frequency band including frequencies 2fp−(fs2−d2) and (fp−d2/2). The filter 323-2 blocks the pump light P32-2 and the signal light Q32-2, and outputs the signal light Q33-2 having a wavelength modified to a target wavelength corresponding to the target frequency fs2. Note that the wavelength adapter 300 may output the separated signal lights Q33-1 to Q33-N as they are, or may output the signal lights Q33-1 to Q33-N with some or all of the signal lights multiplexed.

The wavelength adapter 300 shares pump lights P31-1 to P31-N in the preceding stage. Although the filter 323-*n* in the subsequent stage has a transmission characteristic illustrated in FIG. 4, the frequency can be adjusted by the pump lights P32-1 to P32-N in the preceding stage, and there is no restriction as in Formula (7) for sharing the pump lights P31-1 to P31-N in the preceding stage. However, the frequencies of the signal lights Q31-1 to Q31-N to be subjected to wavelength modification have the following restrictions.

Figure 17:
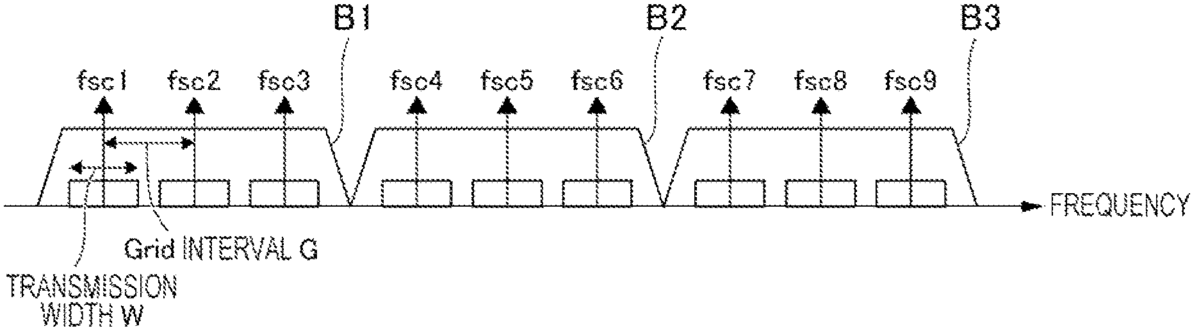
FIG. 17 is a diagram illustrating a transmission width of a demultiplexer according to the embodiment.

FIG. 17 is a diagram illustrating a transmission width of the demultiplexer 314. Here, a case where the demultiplexer 314 performs demultiplexing by using a wavelength-fixed filter is illustrated. In FIG. 17, the frequency is used on the horizontal axis, and a similar relationship is obtained in a case of using the wavelength on the horizontal axis. In the case illustrated here, the frequency of a signal light Q32-(*j*−1) is lower than the frequency of a signal light Q32-*j* (j is an integer of 2 or more and N or less). In the present embodiment, the wavelengths of the signal lights Q32-1 to Q32-N, which are idler lights, need to be away from each other to some extent so that the signal lights can be demultiplexed. For example, when each of the signal lights Q31-1 to Q31-N has a wavelength shift of ±1 grid at the maximum, there is a possibility that the wavelength of each grid is shifted to an adjacent grid. For this reason, in a case of signal lights of adjacent wavelengths away from each other by two grids, that is, signal lights of wavelengths located every three grids, modification can be collectively performed by the wavelength adapter 300 of the present embodiment. The demultiplexer 314 allows for transmission of signal lights by frequency domains B1 to BN including a transmission width W corresponding to a wavelength width of every ±1 grid, that is, 3 grids each. In FIG. 17, fsci indicates a center frequency in a case where the wavelength conversion element 312 performs wavelength conversion on a signal light having no wavelength shift of an i-th (i is an integer of 1 or more) grid by the pump light P31. The frequency fsci and a frequency fsc(i+1) are away from each other by a frequency corresponding to a wavelength width of a grid interval G for one grid. A frequency domain Bn is a frequency band through which the signal light Q32-*n* of a (3n−1)th grid may pass. For example, the demultiplexer 314 outputs, to the wavelength conversion element 322-*n*, the signal light Q32-*n* after transmission through a wavelength width corresponding to the frequency domain Bn. FIG. 17 illustrates that the signal lights of the second, fifth, and eighth grids having center frequencies fsc2, fsc5, and fsc8 in a case where there is no wavelength shift can be shared by the demultiplexer 314 with a fixed filter in a case where the signal lights are to be subjected to wavelength modification.

As described above, in the signal lights Q31-1 to Q31-N, a signal light Q31-(*j*−1) and a signal light Q31-*j* having adjacent wavelengths are away from each other by at least a band by which the signal light Q31-*n* may shift from the target wavelength. The demultiplexer 314 demultiplexes a wavelength band including the wavelengths of the signal lights Q32-1 to Q32-N for each bandwidth based on a wavelength difference between the target wavelength of the signal light Q31-(*j*−1) and the target wavelength of the signal light Q31-*j*.

The demultiplexer 314 is only required to be able to demultiplex each signal light Q32-*n*. Ideally, assuming that the modulation sideband of the signal light Q32-*n* is Mn and the modulation sideband of a signal light Q32-*m* is Mm, it is possible to separate the signal lights in a case where the frequency of the signal light Q32-*n* and the frequency of the signal light Q32-*m* are away from each other by at least Mn/2+Mm/2. However, in this case, in order to block an influence of side lobes other than the main lobe of the modulation sideband, each of the signal light Q32-*n* and the signal light Q32-*m* is passed through a filter before being input to the wavelength conversion element 312. The signal light Q32-*n* is passed through a filter having an Mn width corresponding to the main lobe of the signal light Q32-*n*, and the signal light Q32-*m* is passed through a filter having an Mm width corresponding to the main lobe of the signal light Q32-*m*. In a case where the use of an equalizer is assumed, it is only required that 50% of one side of the main lobe, that is, Mn/4 or Mm/4, be included in a case of double-sideband modulation. For this reason, in a case where the frequency of the signal light Q32-*n* and the frequency of the signal light Q32-*m* are away from each other by at least Mn/4+Mm/4, the signal lights can be separated. In a case of single-sideband modulation, the frequencies are only required to be away from each other by at least Mn/2 or Mm/2.

In addition, in a case where a signal light Q32-*n* having a plurality of wavelengths is input to the wavelength conversion element 322-*n* in the subsequent stage, the signal lights Q31-1 before being converted into the signal light Q32-*n* having the plurality of wavelengths have restrictions similar to those in a case where a plurality of signal lights Q11 to be subjected to wavelength modification is input to the wavelength adapter 100 of the first embodiment.

According to the present embodiment, the number of wavelength conversion elements can be reduced as compared with a case of using a plurality of the wavelength adapters of the first embodiment.

Fourth Embodiment

The present embodiment provides an optical gateway (GW) using the wavelength adapter 100 of the first embodiment.

Figure 18:
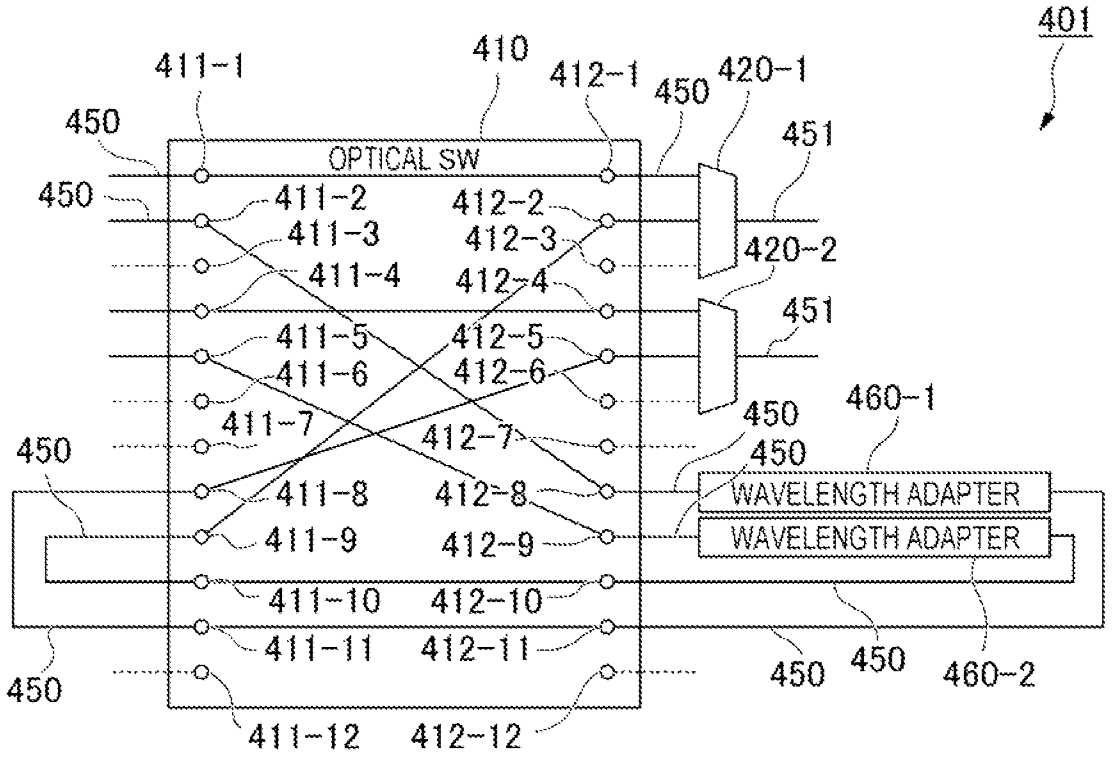
FIG. 18 is a configuration diagram of an optical GW according to a fourth embodiment.

FIG. 18 is a diagram illustrating a configuration example of an optical GW 401. The optical GW 401 includes an optical switch (SW) 410. The optical SW 410 includes ports 411-1 to 411-K (K is an integer of 2 or more) and ports 412-1 to 412-L (L is an integer of 2 or more). The ports 411-1 to 411-K are, without identification of each port, or collectively, referred to as the ports 411, and the ports 412-1 to 412-L are, without identification of each port, or collectively, referred to as the ports 412. In accordance with a route set in advance, the optical GW 401 outputs, to the port 412, a signal light input from the port 411, and outputs, to the port 411, a signal light input from the port 412. Wavelengths corresponding to the ports 411 and 412 are set in advance.

Each port 411 and each port 412 perform one or both of input of a signal light from a transmission path 450 and output of a signal light to the transmission path 450. The optical SW 410 is connected to an optical node such as a subscriber device (not illustrated) or another optical GW via the transmission path 450. The transmission path 450 may connect ports 411, or may connect ports 412. In the optical SW 410 illustrated in FIG. 18, a port 411-8 and a port 411-11 are connected by a transmission path 450, and a port 411-9 and a port 411-10 are connected by a transmission path 450.

The optical SW 410 may be connected to one or more WDM devices 420 via transmission paths 450. The WDM device 420 multiplexes signal lights having different wavelengths output from a plurality of ports 412, and outputs the multiplexed signal lights to a multiplex communication transmission path 451. The optical SW 410 illustrated in FIG. 18 is connected to two WDM devices 420: a WDM device 420-1 and a WDM device 420-2. The WDM device 420-1 multiplexes signal lights output from the ports 412-1 to 412-3 and outputs the multiplexed signal lights to the multiplex communication transmission path 451. The WDM device 420-2 multiplexes signal lights output from the ports 412-4 to 412-6 and outputs the multiplexed signal lights to the multiplex communication transmission path 451.

The optical SW 410 may be connected to one or more wavelength adapters 460. The wavelength adapter 460 is the wavelength adapter 100 in the first embodiment. The wavelength adapter 460 modifies the wavelength of a signal light output from a port 412 of the optical SW 410, and inputs the signal light after the modification from another port 412 to the optical SW 410. Two wavelength adapters 460 connected to the optical SW 410 are referred to as wavelength adapters 460-1 and 460-2. The wavelength adapter 460-1 is connected to each of the port 412-8 and the port 412-11 via a transmission path 450, and the wavelength adapter 460-2 is connected to each of the port 412-9 and the port 412-10 via a transmission path 450.

An operation example of the optical GW 401 will be described. The optical SW 410 outputs, from the port 412-1, a signal light input from the port 411-1. The optical SW 410 outputs, from the port 412-8, a signal light input from the port 411-2. The wavelength adapter 460-1 modifies the wavelength of the signal light output from the port 412-8 and outputs the signal light. The optical SW 410 receives the signal light having the modified wavelength from the port 412-11, and outputs the signal light from the port 411-11. The port 411-8 of the optical SW 410 receives the signal light output from the port 411-11, and outputs the signal light to the port 412-5.

The optical SW 410 outputs, from the port 412-4, a signal light input from the port 411-4. The optical SW 410 outputs, from the port 412-9, a signal light input from the port 411-5. The wavelength adapter 460-2 modifies the wavelength of the signal light output from the port 412-9 and outputs the signal light. The optical SW 410 receives the signal light having the modified wavelength from the port 412-10, and outputs the signal light from the port 411-10. The optical SW

410 receives, from the port 411-9, the signal light output from the port 411-10, and outputs the signal light to the port 412-2.

The WDM device 420-1 multiplexes a signal light output from the port 412-1 and a signal light after wavelength modification output from the port 412-2, and outputs the multiplexed signal light to the multiplex communication transmission path 451. The WDM device 420-2 multiplexes a signal light output from the port 412-4 and a signal light after wavelength modification output from the port 412-5, and outputs the multiplexed signal light to the multiplex communication transmission path 451.

Figure 19:
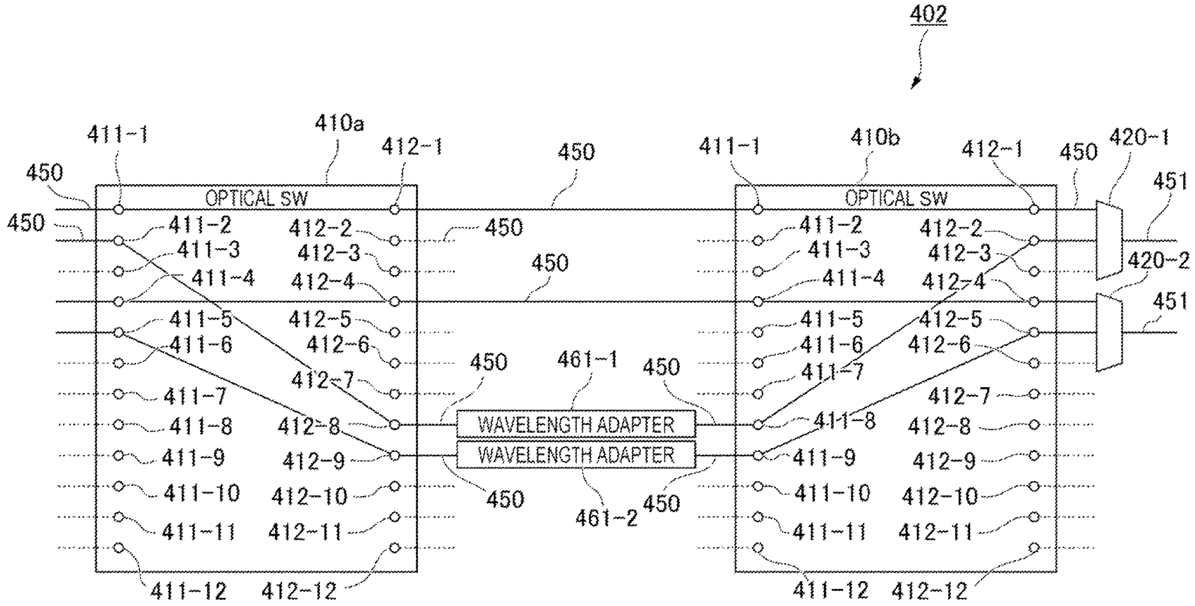
FIG. 19 is a configuration diagram of an optical GW according to the embodiment.

FIG. 19 is a diagram illustrating a configuration of an optical GW 402. The optical GW 402 includes two optical SWs 410. The two optical SWs 410 are referred to as optical SWs 410*a* and 410*b*. The port 412 of the optical SW 410*a* and the port 411 of the optical SW 410*b* are connected by a transmission path 450.

A wavelength adapter 461 is provided in one or more transmission paths 450 between the optical SW 410*a* and the optical SW 410*b*. The wavelength adapter 461 is the wavelength adapter 100 in the first embodiment. Two wavelength adapters 461 are referred to as wavelength adapters 461-1 and 461-2. The wavelength adapter 461-1 is provided in the transmission path 450 between the port 412-8 of the optical SW 410*a* and the port 411-8 of the optical SW 410*b*, and the wavelength adapter 461-2 is provided in the transmission path 450 between the port 412-9 of the optical SW 410*a* and the port 411-9 of the optical SW 410*b*.

The optical SW 410*b* may be connected to one or more WDM devices 420 via transmission paths 450. The optical SW 410*b* illustrated in FIG. 19 is connected to two WDM devices 420: the WDM device 420-1 and the WDM device 420-2. The WDM device 420-1 multiplexes signal lights output from the ports 412-1 to 412-3 of the optical SW 410*b*, and outputs the multiplexed signal lights to the multiplex communication transmission path 451. The WDM device 420-2 multiplexes signal lights output from the ports 412-4 to 412-6 of the optical SW 410*b*, and outputs the multiplexed signal lights to the multiplex communication transmission path 451.

An operation example of the optical GW 402 will be described. The optical SW 410*a* outputs, from the port 412-1, a signal light input from the port 411-1. The optical SW 410*b* receives, from the port 411-1, the signal light output from the port 412-1 of the optical SW 410*a*, and outputs the signal light from the port 412-1. The optical SW 410*a* outputs, from the port 412-8, a signal light input from the port 411-2. The wavelength adapter 461-1 modifies the wavelength of the signal light output from the port 412-8 of the optical SW 410*a* and outputs the signal light. The optical SW 410*b* receives the signal light having the modified wavelength from the port 411-8, and outputs the signal light from the port 412-2.

The optical SW 410*a* outputs, from the port 412-4, a signal light input from the port 411-4. The optical SW 410*b* receives, from the port 411-4, the signal light output from the port 412-4 of the optical SW 410*a*, and outputs the signal light from the port 412-4. The optical SW 410*a* outputs, from the port 412-9, a signal light input from the port 411-5. The wavelength adapter 461-2 modifies the wavelength of the signal light output from the port 412-9 of the optical SW 410*a* and outputs the signal light. The optical SW 410*b* receives the signal light having the modified wavelength from the port 411-9, and outputs the signal light from the port 412-5.

The WDM device 420-1 multiplexes a signal light output from the port 412-1 of the optical SW 410*b* and a signal light after wavelength modification output from the port 412-2, and outputs the multiplexed signal light to the multiplex communication transmission path 451. The WDM device 420-2 multiplexes a signal light output from the port 412-4 of the optical SW 410*b* and a signal light after wavelength modification output from the port 412-5, and outputs the multiplexed signal light to the multiplex communication transmission path 451.

Fifth Embodiment

The present embodiment provides an optical GW using the wavelength adapter 200 of the second embodiment or the wavelength adapter 300 of the third embodiment.

Figure 20:
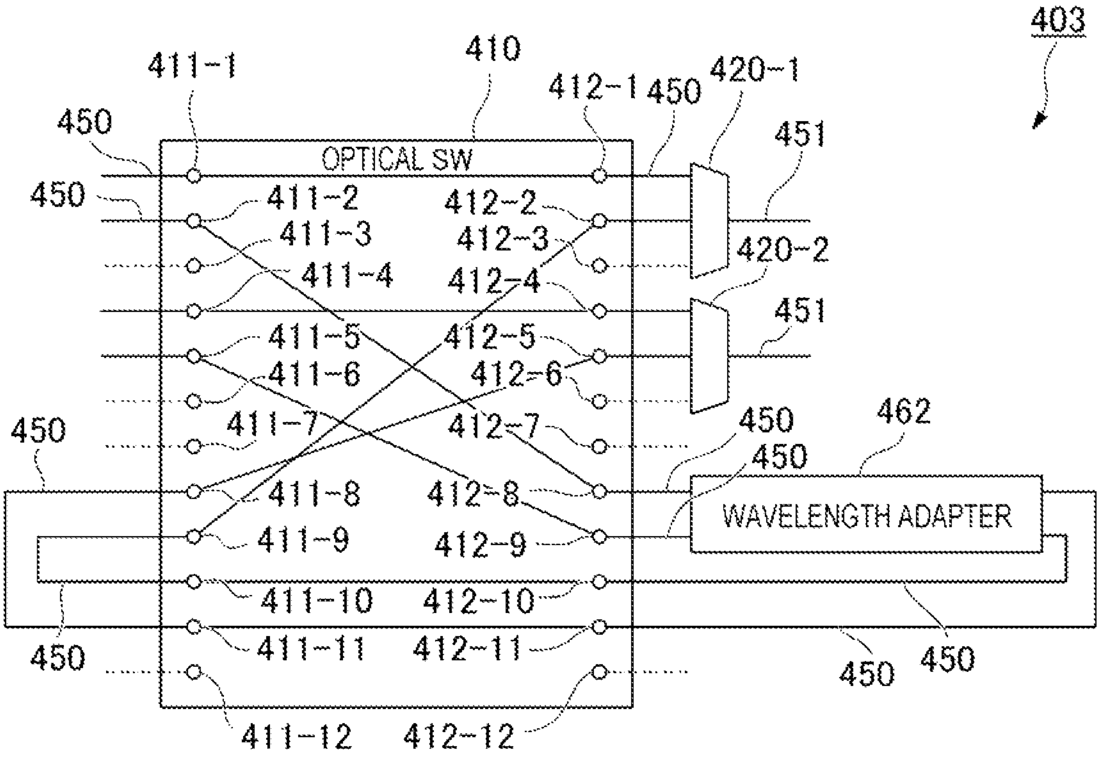
FIG. 20 is a configuration diagram of an optical GW according to a fifth embodiment.

FIG. 20 is a diagram illustrating a configuration example of an optical GW 403. In the optical GW 403 illustrated in FIG. 20, the same portions as those of the optical GW 401 according to the fourth embodiment illustrated in FIG. 18 are denoted by the same reference numerals, and the description thereof will be omitted. The optical GW 403 illustrated in FIG. 20 is different from the optical GW 401 illustrated in FIG. 18 in that a wavelength adapter 462 is provided instead of the wavelength adapters 460-1 and 460-2. The wavelength adapter 462 is the wavelength adapter 200 in the second embodiment or the wavelength adapter 300 in the third embodiment. A signal light input side of the wavelength adapter 462 is connected to each of a port 412-8 and a port 412-9 by a transmission path 450, and a signal light output side of the wavelength adapter 462 is connected to each of a port 412-10 and a port 412-11 by a transmission path 450.

The optical GW 403 operates similarly to the optical GW 401 illustrated in FIG. 18, except for the followings. That is, the wavelength adapter 462 modifies the wavelength of a signal light output from the port 412-8 of an optical SW 410 and outputs the signal light to a transmission path 450 connected with a port 411-11, and modifies the wavelength of a signal light output from the port 412-9 of the optical SW 410 and outputs the signal light to a transmission path 450 connected with a port 411-10. As described above, the wavelength adapter 462 modifies the wavelengths of a plurality of signal lights, and outputs the plurality of signal lights after the wavelength modification to transmission paths 450 connected with different ports 412, depending on the wavelengths of the signal lights.

Figure 21:
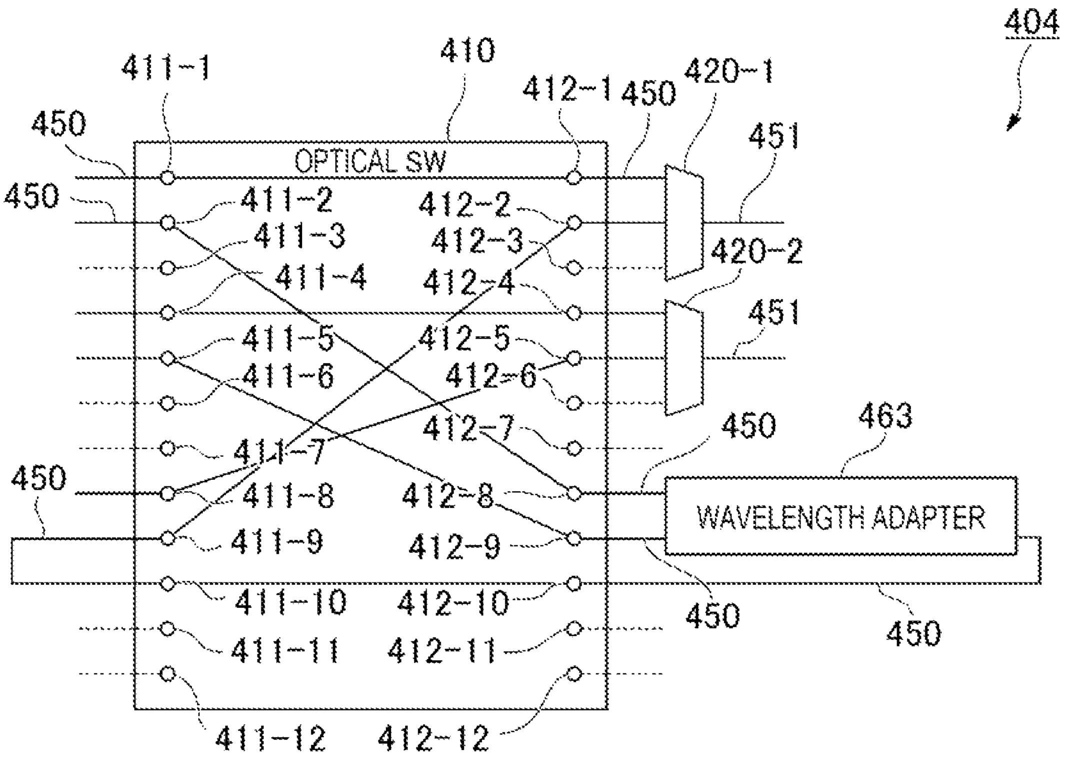
FIG. 21 is a configuration diagram of an optical GW according to the embodiment.

FIG. 21 is a diagram illustrating a configuration of an optical GW 404. In the optical GW 404 illustrated in FIG. 21, the same portions as those of the optical GW 403 illustrated in FIG. 20 are denoted by the same reference numerals, and the description thereof will be omitted. The optical GW 404 illustrated in FIG. 21 is different from the optical GW 403 illustrated in FIG. 20 in that a wavelength adapter 463 is provided instead of the wavelength adapter 462. The wavelength adapter 463 is the wavelength adapter 200 in the second embodiment or the wavelength adapter 300 in the third embodiment. However, the wavelength adapter 463 multiplexes and outputs a plurality of signal lights subjected to wavelength modification. A signal light input side of the wavelength adapter 463 is connected to each of the port 412-8 and the port 412-9 by a transmission path 450, and a signal light output side is connected to the port 412-10 by a transmission path 450.

An operation example of the optical GW 404 will be described. The optical SW 410 outputs, from a port 412-1, a signal light input from a port 411-1, outputs, from a port

412-4, a signal light input from a port 411-4, and outputs, from a port 412-5, a signal light input from a port 411-9. The optical SW 410 outputs, from the port 412-8, a signal light input from a port 411-2, and outputs, from the port 412-9, a signal light input from a port 411-5. The wavelength adapter 463 outputs a WDM signal obtained by multiplexing: a signal light obtained by modifying the wavelength of the signal light output from the port 412-8; and a signal light obtained by modifying the wavelength of the signal light output from the port 412-9. The optical SW 410 receives the WDM signal from the port 412-10, and outputs the WDM signal from the port 411-10. The optical SW 410 receives, from the port 411-9, the WDM signal output from the port 411-10, and outputs the WDM signal to a port 412-2.

A WDM device 420-1 multiplexes a signal light output from the port 412-1 and a WDM signal output from the port 412-2, and outputs the multiplexed signal to a multiplex communication transmission path 451. A WDM device 420-2 multiplexes a signal light output from the port 412-4 and a signal light output from the port 412-5, and outputs the multiplexed signal light to the multiplex communication transmission path 451.

Figure 22:
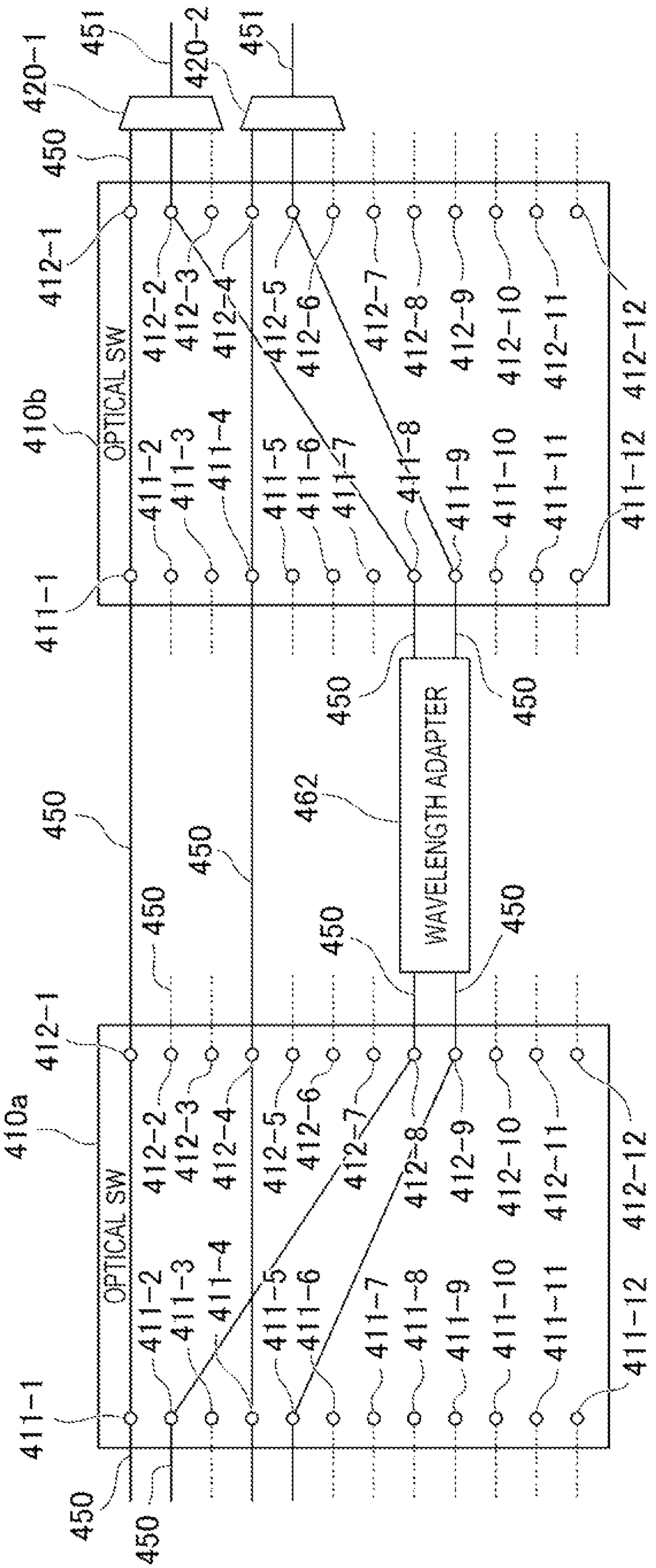
FIG. 22 is a configuration diagram of an optical GW according to the embodiment.

FIG. 22 is a diagram illustrating a configuration of an optical GW 405. In the optical GW 405 illustrated in FIG. 22, the same portions as those of the optical GW 402 according to the fourth embodiment illustrated in FIG. 19 are denoted by the same reference numerals, and the description thereof will be omitted. The optical GW 405 illustrated in FIG. 22 is different from the optical GW 402 illustrated in FIG. 19 in that the wavelength adapter 462 is provided instead of the wavelength adapters 461-1 and 461-2. The signal light input side of the wavelength adapter 462 is connected to each of the port 412-8 and the port 412-9 of an optical SW 410*a* by a transmission path 450, and the signal light output side of the wavelength adapter 462 is connected to each of a port 411-8 and the port 411-9 of an optical SW 410*b* by a transmission path 450.

The optical GW 405 operates similarly to the optical GW 402 illustrated in FIG. 19, except for the following points. That is, the wavelength adapter 462 modifies the wavelength of a signal light output from the port 412-8 of the optical SW 410*a*, and outputs the signal light having the modified wavelength to a transmission path 450 connected to the port 411-8 of the optical SW 410*b*. In addition, the wavelength adapter 462 modifies the wavelength of a signal light output from the port 412-9 of the optical SW 410*a*, and outputs the signal light having the modified wavelength to a transmission path 450 connected to the port 411-9 of the optical SW 410*b*. In this manner, the wavelength adapter 462 modifies the wavelengths of a plurality of signal lights and outputs the plurality of signal lights after the wavelength modification.

Figure 23:
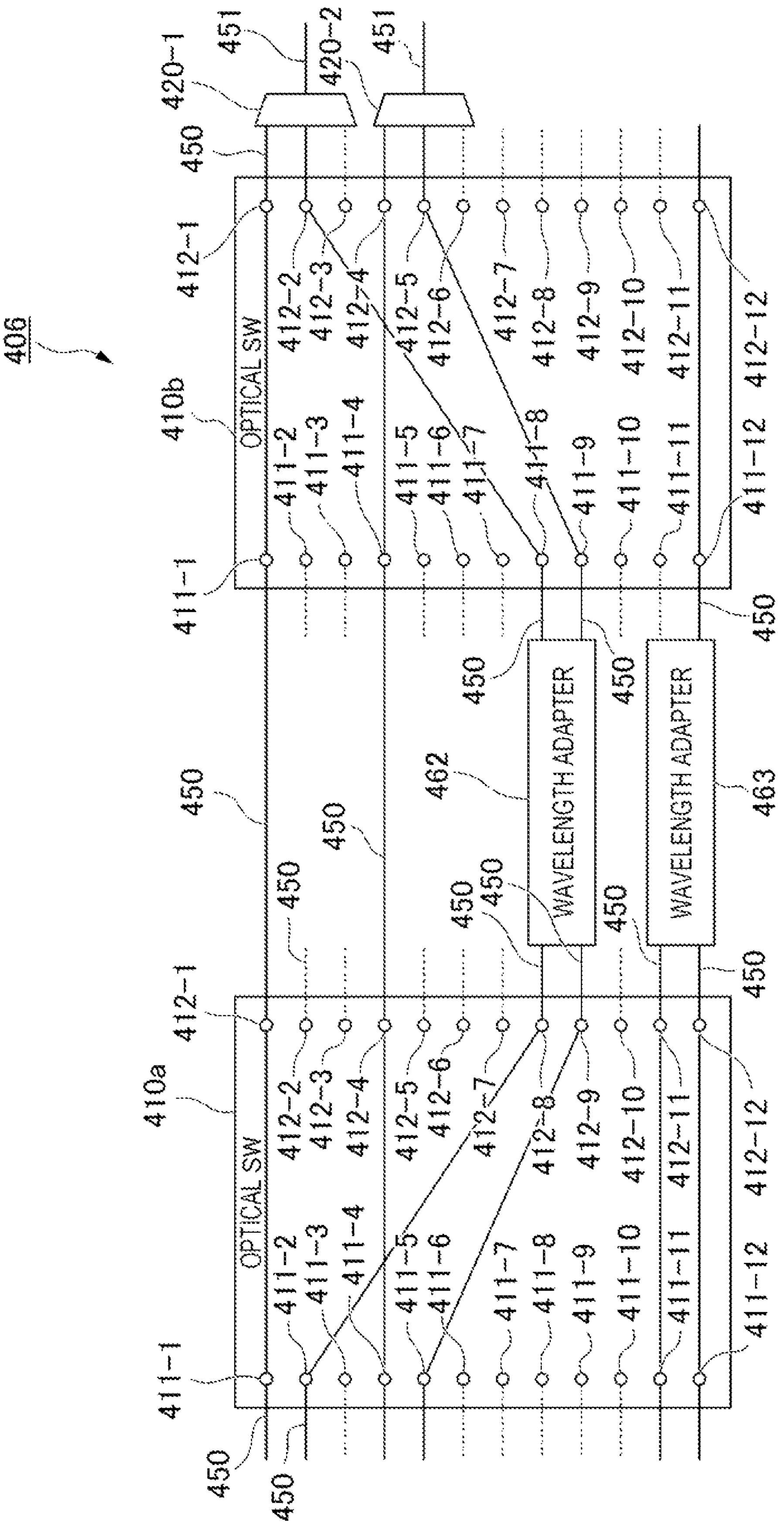
FIG. 23 is a configuration diagram of an optical GW according to the embodiment.

FIG. 23 is a diagram illustrating a configuration of an optical GW 406. In the optical GW 406 illustrated in FIG. 23, the same portions as those of the optical GW 405 illustrated in FIG. 22 are denoted by the same reference numerals, and the description thereof will be omitted. The optical GW 406 illustrated in FIG. 23 is different from the optical GW 405 illustrated in FIG. 22 in that the wavelength adapter 463 is further provided between the optical SW 410*a* and the optical SW 410*b*. The signal light input side of the wavelength adapter 463 is connected to each of the port 412-11 and a port 412-12 of the optical SW 410*a* by a transmission path 450, and the signal light output side is connected to a port 411-12 of the optical SW 410*b* by a transmission path 450.

The optical GW 406 operates similarly to the optical GW 405 illustrated in FIG. 22, except for the followings. That is, the optical SW 410*a* outputs, from the port 412-11, a signal light input from the port 411-11, and outputs, from the port 412-12, a signal light input from the port 411-12. The wavelength adapter 463 outputs a WDM signal to a transmission path 450 connected to the port 411-12 of the optical SW 410*b*, the WDM signal being obtained by multiplexing: a signal light obtained by modifying the wavelength of the signal light output from the port 412-11; and a signal light obtained by modifying the wavelength of the signal light output from the port 412-12. The optical SW 410*b* receives the WDM signal from the port 411-12, and outputs the WDM signal from the port 412-12 to a transmission path 450.

Figure 24:
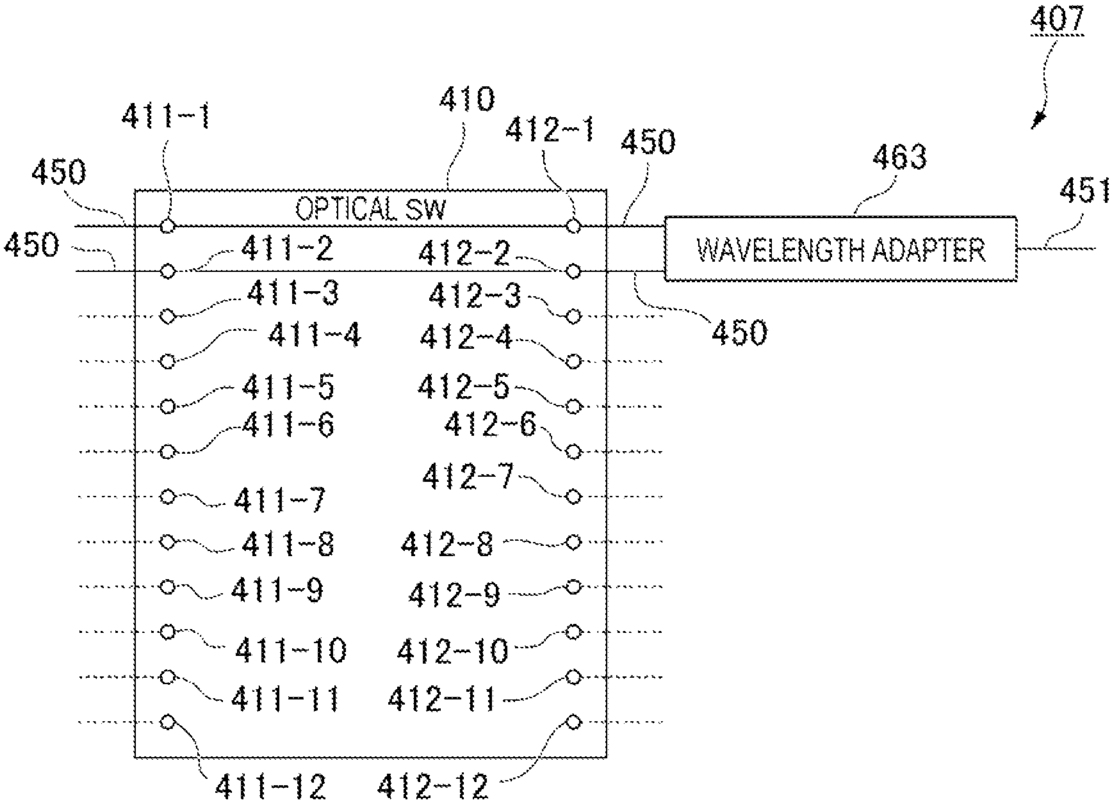
FIG. 24 is a configuration diagram of an optical GW according to the embodiment.

FIG. 24 is a diagram illustrating a configuration of an optical GW 407. The optical GW 407 illustrated in FIG. 24 includes the optical SW 410 and the wavelength adapter 463. The signal light input side of the wavelength adapter 463 is connected to transmission paths 450, each of the transmission paths being connected with one of the ports 412-1 and 412-2 of the optical GW 407, and the signal light output side is connected to the multiplex communication transmission path 451.

An operation example of the optical GW 407 will be described. The optical SW 410 outputs, from the port 412-1, a signal light input from the port 411-1, and outputs, from the port 412-2, a signal light input from the port 411-2. The wavelength adapter 463 outputs, to the multiplex communication transmission path 451, a WDM signal obtained by multiplexing: a signal light obtained by modifying the wavelength of the signal light output from the port 412-1; and a signal light obtained by modifying the wavelength of the signal light output from the port 412-2.

Figure 25:
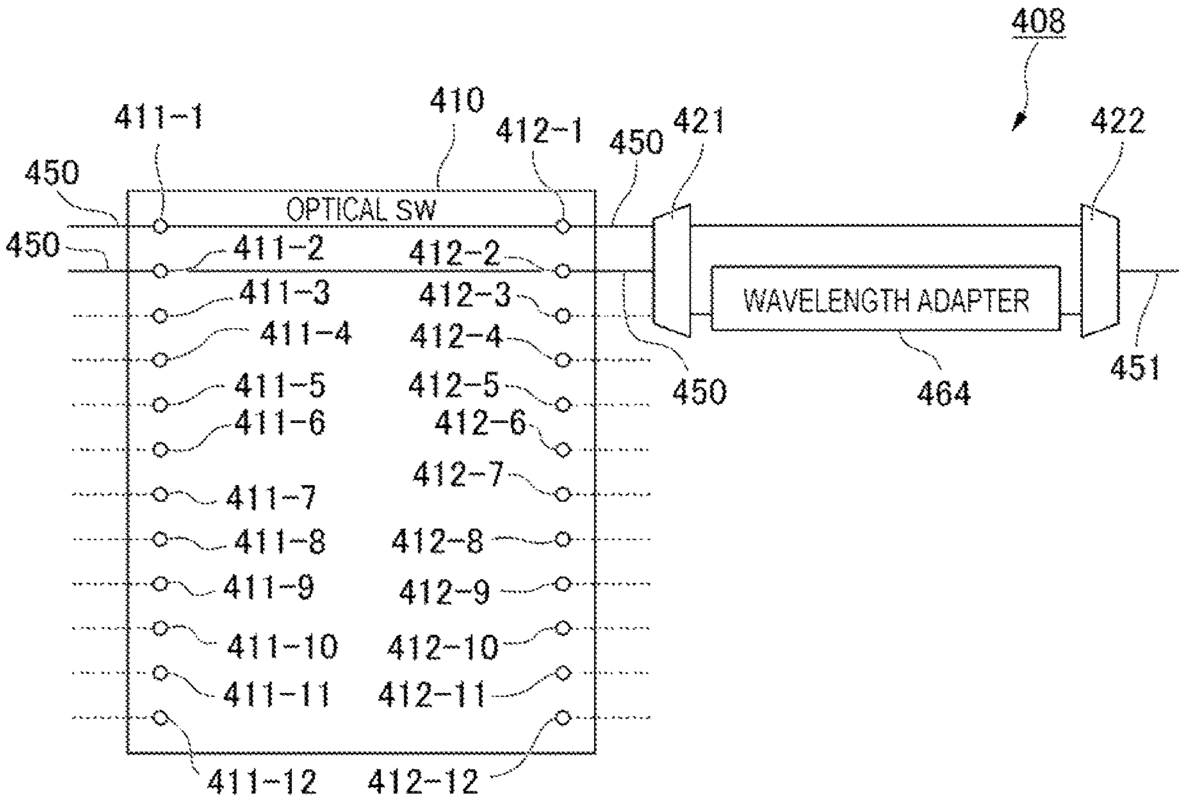
FIG. 25 is a configuration diagram of an optical GW according to the embodiment.

FIG. 25 is a diagram illustrating a configuration of an optical GW 408. The optical GW 408 illustrated in FIG. 25 includes the optical SW 410, WDM devices 421 and 422, and a wavelength adapter 464. One or more wavelength adapters 464 are provided between the WDM device 421 and the WDM device 422. The WDM device 421 is connected to at least one port 412 of the optical SW 410 by a transmission path 450. The WDM device 421 demultiplexes a WDM signal output from the port 412 of the optical SW 410, and outputs the demultiplexed signal light. A part of the signal light demultiplexed by the WDM device 421 is directly output to the WDM device 422, and the other part of the signal light is output to the wavelength adapter 464. Alternatively, all the signal lights demultiplexed by the WDM device 421 may be input to any of the wavelength adapters 464. The wavelength adapter 464 is the wavelength adapter 100 of the first embodiment, the wavelength adapter 200 of the second embodiment, or the wavelength adapter 300 of the third embodiment. The wavelength adapter 464 modifies the wavelength of a signal light demultiplexed by the WDM device 421, and outputs the signal light having the modified wavelength. The WDM device 422 receives the signal light directly input from the WDM device 421 and the signal light having the wavelength modified by the wavelength adapter 464, and multiplexes and outputs these input signal lights to the multiplex communication transmission path 451.

As described above, the optical GW modifies wavelengths by the wavelength adapter only for signal lights to be subjected to wavelength modification, and makes signal lights other than the signal lights to be subjected to wavelength modification to bypass and not pass through the wavelength adapter, and pass through a short-circuit route. Alternatively, the optical GW may modify only the wavelengths of signal lights to be subjected to wavelength modification by the wavelength adapter, and perform wavelength conversion on signal lights other than the signal lights to be subjected to wavelength modification by the wavelength adapter and then return the wavelengths to the original wavelengths. In this case, in an example using degenerate four-wave mixing, the frequency of a pump light is fp both in the preceding stage and in the subsequent stage, and d/2=0 holds.

In a case where each signal light after modification is output as in the wavelength adapter 462, an AWG or the like is used. In a case where signal lights after modification are multiplexed and then output as in the wavelength adapter 463, ASE is removed by demultiplexing the signal lights by the AWG and then multiplexing the signal lights by the AWG, or by using an MZ filter that allows for transmission of grids at intervals. In a case of using the MZ filter, it is desirable to use a filter with a ring resonator having a flat transmission band.

Sixth Embodiment

In a sixth embodiment, a pump light is utilized in the wavelength adapters of the first to third embodiments. In order to utilize the pump light, the wavelength adapter separates the pump light from a signal light before wavelength modification and an idler light generated in the middle. Thus, filters having a plurality of ports are used as the filters of the wavelength adapters of the first to third embodiments. The filter outputs, to different ports, a light having a wavelength for which transmission is to be allowed and a light having a wavelength to be blocked, and extracts only the pump light from the output of the light having the wavelength to be blocked. The extracted pump light is utilized in a configuration of another wavelength adapter.

Specifically, a filter 123 of a wavelength adapter 100 outputs, to another wavelength adapter 100, 200, or 300, a pump light P12 having a frequency fp that has been blocked. A filter 223 of the wavelength adapter 200 outputs, to another wavelength adapter 100, 200, or 300, a pump light P22 having the frequency fp that has been blocked. A filter 313 of the wavelength adapter 300 outputs, to another wavelength adapter 100, 200, or 300, a pump light P31 having the frequency fp that has been blocked. The pump light P12 output from the wavelength adapter 100, the pump light P22 output from the wavelength adapter 200, and the pump light P31 output from the wavelength adapter 300 are collectively referred to as the pump light P.

The wavelength adapter 100 that has received the pump light P is not provided with a light source 121, and uses the pump light P as the pump light P12. The filter 123 of the wavelength adapter 100 that has received the pump light P may output the blocked pump light P to another wavelength adapter 100, 200, or 300. The wavelength adapter 200 that has received the pump light P is not provided with a light source 221, and uses the pump light P as the pump light P22. The filter 223 of the wavelength adapter 200 that has received the pump light P may output the blocked pump light P to another wavelength adapter 100, 200, or 300. Alternatively, the wavelength adapter 300 that has received the pump light P is not provided with a light source 311, and uses the pump light P as the pump light P31. The filter 313 of the wavelength adapter 300 that has received the pump light P may output the blocked pump light P to another wavelength adapter 100, 200, or 300.

For signal lights in which wavelength regions of converted lights after wavelength modification have a predetermined relationship, a pump light having a frequency (fp−dn/2) may be shared by a plurality of wavelength adapters 100, 200, or 300. The predetermined relationship means, for example, signal lights in which a 3 dB bandwidth is included in a 3 dB band of grid transmission. Specifically, a filter 113 of the wavelength adapter 100 outputs a blocked pump light P11 to another wavelength adapter 100, 200, or 300. The target to which the filter 113 outputs the pump light P11 is the wavelength adapter 100, 200, or 300 that outputs a signal light Q13, Q23-*h*, or Q33-*h* having a wavelength that has a predetermined relationship with the wavelength of a signal light P13 (h is an integer of 1 or more and N or less). A filter 213-*n* of the wavelength adapter 200 outputs a blocked pump light P21-*n* to another wavelength adapter 100, 200, or 300. The target to which the filter 213-*n* outputs the pump light P21-*n* is the wavelength adapter 100, 200, or 300 that outputs a signal light Q13, Q23-*h*, or Q33-*h* having a wavelength that has a predetermined relationship with the wavelength of a signal light P23-*n*. A filter 323-*n* of the wavelength adapter 300 outputs a blocked pump light P32-*n* to another wavelength adapter 100, 200, or 300. The target to which the filter 323-*n* outputs the pump light P32-*n* is the wavelength adapter 100, 200, or 300 that outputs a signal light Q13, Q23-*h*, or Q33-*h* having a wavelength that has a predetermined relationship with the wavelength of a signal light Q33-*n* for which transmission is to be allowed. The pump light P11 output from the wavelength adapter 100, the pump light P21-*n* output from the wavelength adapter 200, and the pump light P32-*n* output from the wavelength adapter 300 are collectively referred to as the pump light P'.

The wavelength adapter 100 that has received the pump light P' is not provided with a light source 111, and uses the pump light P' as the pump light P11. The filter 113 of the wavelength adapter 100 that has received the pump light P' may output the blocked pump light P' to another wavelength adapter 100, 200, or 300. The wavelength adapter 200 that has received the pump light P' is not provided with a light source 211-*h*, and uses the pump light P' as a pump light P21-*h*. A filter 213-*h* of the wavelength adapter 200 that has received the pump light P' may output the blocked pump light P' to another wavelength adapter 100, 200, or 300. Alternatively, the wavelength adapter 300 that has received the pump light P' is not provided with a light source 321-*h*, and uses the pump light P' as a pump light P32-*h*. A filter 323-*h* of the wavelength adapter 300 that has received the pump light P' may output the blocked pump light P' to another wavelength adapter 100, 200, or 300.

Note that the pump light can be utilized up to the number of times at which the signal light after modification has an allowable intensity.

Figure 26:
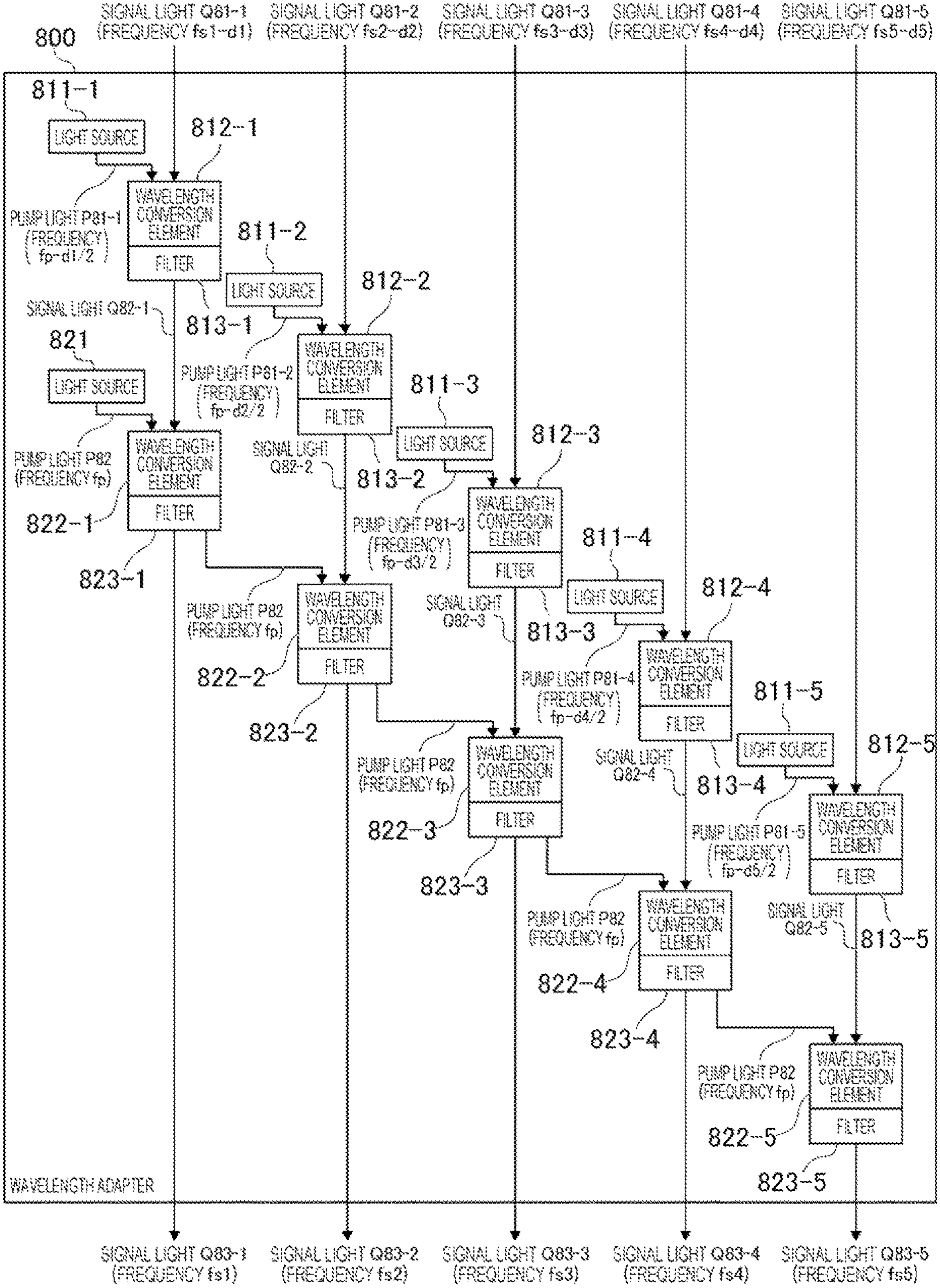
FIG. 26 is a configuration diagram of a wavelength adapter according to a sixth embodiment.

FIG. 26 is a diagram illustrating a configuration example of a wavelength adapter 800. The wavelength adapter 800 corresponds to a configuration in which N (N is an integer of or more) wavelength adapters 100 are provided. FIG. 26 illustrates an example of a case where N=5 holds. The wavelength adapter 800 modifies the wavelength of a signal light Q81-*n* in which a wavelength shift has occurred to a target frequency fsn corresponding to a target wavelength in a target wavelength band (n is an integer of 1 or more and N or less). All or some of frequencies fs1 to fsN may be the same frequency. The wavelength adapter 800 includes light sources 811-1 to 811-N and 821, wavelength conversion elements 812-1 to 812-N and 822-1 to 822-N, and filters 813-1 to 813-N and 823-1 to 823-N.

A light source 811-*n*, a wavelength conversion element 812-*n*, a filter 813-*n*, and the light source 821 have functions similar to those of the light source 111, the wavelength conversion element 112, the filter 113, and the light source 121 of the first embodiment, respectively.

A wavelength conversion element 822-*n* has a function similar to that of the wavelength conversion element 122 of the first embodiment. Here, a wavelength conversion element 822-*j* (j is an integer of 2 or more and N or less) receives a pump light output from a filter 823-(*j*−1). A filter 823-*n* has a plurality of ports. The filter 823-*n* blocks a wavelength band including the wavelength of a pump light output from the wavelength conversion element 822-*n* and the wavelength of a signal light as an idler light, and allows for transmission of a wavelength band including the wavelength of the signal light after modification. The filter 823-*n* outputs the signal light after modification from a port, outputs the pump light included in the blocked light from another port, and inputs the pump light to a wavelength conversion element 822-(*n*+1). Note that the filter 823-N may not output the pump light.

The transmission characteristic of the filter 813-1 is similar to the transmission characteristic of the filter 213-1 illustrated in FIG. 11, and the transmission characteristic of the filter 813-2 is similar to the transmission characteristic of the filter 213-2 illustrated in FIG. 12. The transmission characteristic of the filter 823-1 is similar to the transmission characteristic of the filter 123 illustrated in FIG. 3. The pump light having the frequency fp for which transmission is not allowed by the filter 823-1 is utilized for the filters 823-2 to 823-N.

An operation of the wavelength adapter 800 will be described. The wavelength adapter 800 modifies the signal light Q81-*n* in which a wavelength shift has occurred to a target wavelength in a target wavelength band. The frequency corresponding to the target wavelength in the target wavelength band of the signal light Q81-*n* is referred to as the target frequency fsn.

The wavelength adapter 800 receives the signal light Q81-*n* having a frequency (fsn−dn). The light source 811-*n* generates a pump light P81-*n* having the frequency (fp−dn/2). The pump light P81-*n* is a first pump light. The wavelength conversion element 812-*n* receives the pump light P81-*n* and the signal light Q81-*n*, and generates a signal light Q82-*n* having a frequency (2fp−fsn), which is an idler light. The filter 813-*n* receives the pump light P81-*n*, the signal light Q81-*n*, and the signal light Q82-*n* from the wavelength conversion element 812-*n*. The filter 813-*n* blocks the pump light P81-*n* and the signal light Q81-*n*, and outputs the signal light Q82-*n* to the wavelength conversion element 822-*n*.

The light source 821 generates a pump light P82 having the frequency fp. The pump light P82 is a second pump light. The wavelength conversion element 822-1 receives the pump light P82 from the light source 821, receives a signal light Q82-1 from the filter 813-1, and generates a signal light Q83-1 having the frequency fs1, which is an idler light. The filter 823-1 receives the pump light P82, the signal light Q82-1, and the signal light Q83-1 from the wavelength conversion element 822-1. The filter 823-1 outputs the signal light Q83-1 to the outside, and outputs the pump light P82 to the wavelength conversion element 822-2.

The wavelength conversion element 822-*j* receives the pump light P82 from a filter 813-(*j*−1), receives a signal light Q82-*j* from a filter 813-*j*, and generates a signal light Q83-*j* having a frequency fsj, which is an idler light. A filter 823-*j* receives the pump light P82, the signal light Q82-*j*, and the signal light Q83-*j* from the wavelength conversion element 822-*j*. The filter 823-*j* outputs the signal light Q83-*j* to the outside, and outputs the pump light P82 to a wavelength conversion element 822-(*j*+1).

As described above, the wavelength adapter 800 can modify the wavelengths of the signal lights Q81-1 to Q81-N in which the wavelengths have shifted. As described above, the pump light P82 having the frequency fp generated by the light source 821 can be utilized as it is by a plurality of the filters 823-1 to 823-N in the subsequent stage. In addition, the pump light having the frequency (fp−dn/2) generated by the light source 811-*n* may be shared by signal lights in which the wavelength regions of the converted lights after wavelength modification have a predetermined relationship, for example, signal lights in which the 3 dB bandwidth is included in the 3 dB band of grid transmission.

Similarly to the example of a case where the pump light P12 having the frequency fp of the wavelength adapter 100 is shared described above, the pump light P22 having the frequency fp of the wavelength adapter 200 may be shared, or the pump light P31 having the frequency fp of the wavelength adapter 300 may be shared. The condition for sharing is similar to that in the first embodiment. That is, the condition is that the following Formula (13) is satisfied. Here, n and n' are integers of 1 or more and N or less, and Mn that is the FWHM of the signal light Q81-*n* and Mn' that is the FWHM of a signal light Q81-*n*' are both referred to as M.

$$-(W/2 - M/2) \leq dn - dn' \leq (W/2 - M/2) \tag{13}$$

The frequency fp may not be common to all wavelength adapters, but may be treated as a different frequency for each wavelength adapter, and a pump light having the frequency fp used in a wavelength adapter may be used as a pump light having the frequency (fp−dn/2) in another wavelength adapter. In this case, the pump light P12 output from the filter 123 of the wavelength adapter 100, the pump light P22 output from the filter 223 of the wavelength adapter 200, or the pump light P31 output from the filter 313 of the wavelength adapter 300 may be shared as the pump light P11 of the wavelength adapter 100, the pump light P21-*n* of the wavelength adapter 200, and the pump light P32-*n* of the wavelength adapter 300. In addition, the pump light P11 output from the filter 113 of the wavelength adapter 100, the pump light P21-*n* output from the filter 213-*n* of the wavelength adapter 200, and the pump light P32-*n* output from the filter 323-*n* of the wavelength adapter 300 may be shared as the pump light P12 of the wavelength adapter 100, the pump light P22 of the wavelength adapter 200, or the pump light P31 of the wavelength adapter 300. The condition for sharing is that the signal light after modification satisfies a predetermined upper limit.

According to the embodiments described above, a wavelength adapter includes a first conversion unit, a first filter, a second conversion unit, and a second filter. The wavelength adapter corresponds to, for example, the wavelength adapters 100, 200, 300, and 800 of the embodiments. The first conversion unit corresponds to, for example, the wavelength conversion elements 112, 212-1 to 212-N, 312, and 812-1 to 812-N of the embodiments. The first filter corresponds to, for example, the filters 113, 213-1 to 213-N, 313, and 813-1 to 813-N of the embodiments. The second conversion unit corresponds to, for example, the wavelength conversion elements 122, 222, 322-1 to 322-N, and 822-1 to 822-N of the embodiments. The second filter corresponds to, for example, the filters 123, 223, 323-1 to 323-N, and 823-1 to 823-N of the embodiments.

The first filter converts, by the first pump light, a first signal light into a second signal light having a wavelength not included in a target wavelength band while maintaining a phase relationship of the first signal light. The first filter blocks the first signal light and the first pump light, and allows for transmission of the second signal light. The second conversion unit converts, by the second pump light, the second signal light after transmission through the first filter into a third signal light having a wavelength in the target wavelength band while maintaining a phase relationship of the second signal light. The second filter blocks the second signal light and the second pump light, and allows for transmission of the third signal light.

The wavelength adapter may include a set of the first conversion unit and the first filter corresponding to each one of a plurality of the first signal lights having different wavelengths. In this case, the second conversion unit converts, by the second pump light, a plurality of the second signal lights after transmission individually through a plurality of the first filters into the third signal lights having wavelengths in the different target wavelength bands while maintaining the phase relationship of the second signal lights. The second filter blocks the plurality of the second signal lights and a plurality of the second pump lights, and allows for transmission of a plurality of the third signal lights. A frequency of the first pump light for converting the first signal light into the second signal light is a frequency shifted from a frequency of the second pump light by a frequency corresponding to a shift between a frequency of the first signal light and a frequency corresponding to a target wavelength in the target frequency band corresponding to the first signal light.

The first conversion unit may convert, by the first pump light, a plurality of the first signal lights having different wavelengths into the second signal lights having wavelengths that are different from each other and are not included in any of the target wavelength bands corresponding to the first signal lights, while maintaining the phase relationship of the first signal lights. The first filter blocks a plurality of the first signal lights and the first pump light, and allows for transmission of a plurality of the second signal lights. The wavelength adapter includes a demultiplexer that separates, based on wavelength, the plurality of the second signal lights after transmission through the first filter, and a set of the second conversion unit and the second filter for each one of the plurality of the second signal lights which has been demultiplexed by the demultiplexer. A frequency of the second pump light for converting the second signal light into the third signal light is a frequency shifted from a frequency of the first pump light by a frequency in accordance with a shift between a frequency corresponding to a target wavelength in the target wavelength band corresponding to the first signal light converted into the second signal light and a frequency of the first signal light. The target wavelengths of different ones of the first signal lights are away from each other by at least a wavelength width by which the wavelength of the first signal light is likely to shift from the target wavelength of the first signal light. The demultiplexer performs demultiplexing for each bandwidth based on a wavelength difference between the target wavelengths of different ones of the first signal lights.

The first conversion unit may receive the first signal light from a first optical switch having a plurality of first ports, and receiving a signal light from any of the first ports and outputting the signal light from another one of the first ports. The second filter may output the third signal light to a second optical switch having a plurality of second ports, and receiving a signal light from any of the second ports and outputting the signal light from another one of the second ports, or may output the third signal light to the first optical switch.

The wavelength adapter may receive the plurality of the first signal lights from different ones of a plurality of first ports of a first optical switch having a plurality of the first ports, and receiving a signal light from any of the first ports and outputting the signal light from another one of the first ports. The wavelength adapter may output the plurality of the third signal lights to the same one or different ones of second ports of a second optical switch having a plurality of the second ports, and receiving a signal light from any of the second ports and outputting the signal light from another one of the second ports, or may output a plurality of the third signal lights to the same one or different ones of the first ports of the first optical switch.

The first filter may output the first pump light to another wavelength adapter. The first pump light output from the first filter is used as the first pump light or the second pump light in the another wavelength adapter. The first filter may output the first pump light to another wavelength adapter that outputs a third signal light having a wavelength in a predetermined relationship with a wavelength of the third signal light generated on the basis of the first signal light. The first pump light which has been output from the first filter is used as the first pump light or the second pump light in the another wavelength adapter.

The second filter may output the second pump light to another wavelength adapter. The second pump light which has been output from the second filter is used as the first pump light or the second pump light in the another wavelength adapter. The second filter may output the second pump light to another wavelength adapter that outputs a third signal light having a wavelength in a predetermined relationship with a wavelength of the third signal light for which transmission is to be allowed. The second pump light which has been output from the second filter is used as the first pump light or the second pump light in the another wavelength adapter.

While the above description has been given focusing on the operation of converting a wavelength, processing of the present embodiment may be performed in accordance with control from an optical GW, a network thereof, or a controller related to any one of them. Furthermore, the processing of the present embodiment may be performed in accordance with control from a functional unit that detects a wavelength shift or a monitor. By snooping on an instruction to a transmitter and using an observation value in a functional unit that observes a wavelength of a signal light or a monitor, a functional unit that performs processing of the present embodiment may determine a shift and perform the above-described processing.

In the present embodiment, an input wavelength is converted into a predetermined wavelength by a wavelength adapter provided at the entrance of the network. However, the reception wavelength may be converted back to the input wavelength by a wavelength adapter provided at the outlet of the network. In this case, information related to the wavelength at the time of input is transmitted to the outlet side. The information related to the wavelength at the time of input is, for example, at least any one of the followings: the center wavelength of a signal light, the intermediate value of the wavelength width of the signal light, the maximum value of the wavelength spectrum of the signal light, the wavelength of each pump light used for conversion, the value of the wavelength of one pump light in a case where the wavelength of another pump light is a predetermined value, a wavelength difference between a pump light having a predetermined value and another pump light, and the value for returning the signal light to the original state on the output side. The value for returning the signal light to the original state on the output side is, for example, a value of the wavelength of the pump light to be set on the outlet side. In a case where the processing of the present embodiment is controlled by a controller, another functional unit, or the like, the controller may transmit these values. Alternatively, the functional unit that performs the processing of the present embodiment may transmit these values to a functional unit on the exit side. This is suitable in a case where the functional unit that performs the processing of the present embodiment performs determination. Returning the signal light to the original wavelength as described above has an effect of acting as a remedy in a case where the wavelength to be received by the receiving side of a corresponding user has shifted as in the transmission side.

Although the embodiments of the present invention have been described in detail with reference to the drawings so far, specific configurations are not limited to these embodiments, and include designs and the like without departing from the gist of the invention.

REFERENCE SIGNS LIST

100, 200, 300, 460-1, 460-2, 461-1, 461-2, 462, 463, 464, 800 Wavelength adapter
111, 121, 211-1, 211-2, 221, 311, 321-1, 321-2, 811-1 to 811-5, 821 Light source
112, 122, 212-1, 212-2, 222, 312, 322-1, 322-2, 812-1 to 812-5, 822-1 to 822-5 Wavelength conversion element
113, 123, 213-1, 213-2, 223, 313, 323-1, 323-2, 813-1 to 813-5, 823-1 to 823-5 Filter
314 Demultiplexer
401, 402, 403, 404, 405, 406, 407, 408 Optical GW
410, 410*a*, 410*b* Optical SW
411-1 to 411-12, 412-1 to 412-12 Port
420-1, 420-2, 421, 422 WDM device
450 Transmission path
451 Multiplex communication transmission path

The invention claimed is:

1. A wavelength adapter comprising:
one or more first converters, each converting, by a first pump light, a first signal light into a second signal light having a wavelength not included in a target wavelength band of the first signal light while maintaining a phase relationship of the first signal light;
one or more first filters, each blocking the first signal light and the first pump light, and allowing for transmission of the second signal light;
one or more second converters, each converting, by a second pump light, the second signal light output from the one or more first filters into a third signal light having a wavelength in the target wavelength band while maintaining a phase relationship of the second signal light; and
one or more second filters, each blocking the second signal light and the second pump light, and allowing for transmission of the third signal light.

2. The wavelength adapter according to claim 1, comprising:
the one or more first converters and the one or more first filters are composed of a plurality of first converters corresponding to different wavelengths and a plurality of first filters corresponding to each of the plurality of first converters,
in which at least one of the one or more second converters converts a plurality of the second signal lights into the third signal lights having wavelengths in the respective target wavelength band while maintaining the phase relationship of the respective second signal light, and
the at least one of the one or more second filter blocks the plurality of the second signal lights and the second pump light, and allows for transmission of a plurality of the third signal lights.

3. The wavelength adapter according to claim 2, wherein
a frequency of the first pump light of each of the plurality of first converters for converting the first signal light into the second signal light is a frequency shifted from a frequency of the second pump light by a frequency corresponding to a shift between a frequency of the first signal light to be converted and a frequency corresponding to a target wavelength in the target wavelength band of the first signal light.

4. The wavelength adapter according to claim 2, wherein
a plurality of the first signal lights which have been output from different ones of a plurality of first ports of a first optical switch, and receiving a signal light from any of the first ports and outputting the signal light from another one of the first ports, and
the plurality of the third signal lights are output to the same one or different one of second ports of a second optical switch, and receiving a signal light from any of the second ports and outputting the signal light from another one of the second ports, or are output to the same one or different one of the first ports of the first optical switch.

5. The wavelength adapter according to claim 1, wherein
at least one of the one or more first converters converts a plurality of the first signal lights having different wavelengths into a plurality of the second signal lights respectively, each of the wavelengths of the each of the second signal lights is not included in the target wavelength band corresponding to each of the plurality of the first signal lights, while maintaining the phase relationship of the plurality of the first signal lights,
at least one of the one or more first filters blocks the plurality of the first signal lights and the first pump light, and allows for transmission of the plurality of the second signal lights, and
the wavelength adapter further includes:
a demultiplexer that separates, based on wavelength, the plurality of the second signal lights; and
the one or more second converters and the one or more second filters are composed of a plurality of second converters corresponding to different wavelengths which have been demultiplexed by the demultiplexer and a plurality of second filters corresponding to each of the plurality of second converters.

6. The wavelength adapter according to claim 5, wherein
a frequency of the second pump light of each of the plurality of second converters for converting the second signal light into the third signal light is a frequency shifted from a frequency of the first pump light by a frequency in accordance with a shift between a frequency corresponding to a target wavelength in the target wavelength band of each of the plurality of the first signal lights converted into each of the plurality of the second signal lights and a frequency of each of the plurality of the first signal lights.

7. The wavelength adapter according to claim 6, wherein the target wavelengths of different ones of the plurality of the first signal lights are away from each other by at least a wavelength width by which the wavelength of the first signal light is likely to shift from the target wavelength of the first signal light, and the demultiplexer performs demultiplexing for each bandwidth based on a wavelength difference between the target wavelengths of different ones of the plurality of the first signal lights.

8. The wavelength adapter according to claim 5, wherein at least one of the plurality of second filters outputs the second pump light to another wavelength adapter that outputs another third signal light having a wavelength in a predetermined relationship with a wavelength of the third signal light for which transmission is to be allowed, and the second pump light which has been output from the at least one of the plurality of second filters is used as the first pump light or the second pump light in the another wavelength adapter.

9. The wavelength adapter according to claim 5, wherein a plurality of the first signal lights which have been output from different ones of a plurality of first ports of a first optical switch, and receiving a signal light from any of the first ports and outputting the signal light from another one of the first ports, and the plurality of the third signal lights are output to the same one or different one of second ports of a second optical switch, and receiving a signal light from any of the second ports and outputting the signal light from another one of the second ports, or are output to the same one or different one of the first ports of the first optical switch.

10. The wavelength adapter according to claim 1, wherein the one or more first converters receive the first signal light from a first optical switch having a plurality of first ports, and receiving a signal light from any of the first ports and outputting the signal light from another one of the first ports, and the one or more second filters output the third signal light to a second optical switch having a plurality of second ports, and receiving a signal light from any of the second ports and outputting the signal light from another one of the second ports, or outputs the third signal light to the first optical switch.

11. The wavelength adapter according to claim 1, wherein at least one of the one or more first filters outputs the first pump light to another wavelength adapter, and the first pump light which has been output from the at least one of the one or more first filters is used as the first pump light or the second pump light in the another wavelength adapter.

12. The wavelength adapter according to claim 1, wherein at least one of the one or more first filters outputs the first pump light to another wavelength adapter that outputs a third signal light having a wavelength in a predetermined relationship with a wavelength of the third signal light generated on the basis of the first signal light, and the first pump light which has been output from the at least one of the one or more first filters is used as the first pump light or the second pump light in the another wavelength adapter.

13. The wavelength adapter according to claim 1, wherein at least one of the one or more second filters outputs the second pump light to another wavelength adapter, and the second pump light which has been output from the at least one of the one or more second filters is used as the first pump light or the second pump light in the another wavelength adapter.

14. A wavelength adapter comprising:

one or more first converters, each converting, by a first pump light, a first signal light into a second signal light having a wavelength not included in a target wavelength band while maintaining a phase relationship of the first signal light;

one or more first filters, each blocking the first signal light and the first pump light, and allowing for transmission of the second signal light;

one or more second converters, each converting, by a second pump light, the second signal light into a third signal light having a wavelength in the target wavelength band while maintaining a phase relationship of the second signal light; and one or more second filters, each blocking the second signal light and the second pump light, and allowing for transmission of the third signal light, wherein a frequency of the first pump light is determined based on a shift between a frequency of the first signal light and a frequency of the third signal light.

15. A wavelength adapter comprising:

one or more first converters, each converting, by a first pump light, a first signal light into a second signal light having a wavelength not included in a target wavelength band while maintaining a phase relationship of the first signal light;

one or more first filters, each blocking the first signal light and the first pump light, and allowing for transmission of the second signal light;

one or more second converters, each converting, by a second pump light, the second signal light into a third signal light having a wavelength in the target wavelength band while maintaining a phase relationship of the second signal light; and one or more second filters, each blocking the second signal light and the second pump light, and allowing for transmission of the third signal light, wherein a frequency of the first pump light of each of the plurality of first converters for converting the first signal light into the second signal light is a frequency shifted from a frequency of the second pump light by a frequency corresponding to a shift between a frequency of the first signal light to be converted and a frequency corresponding to a target wavelength in the target wavelength band of the first signal light.

* * * * *